Oct. 24, 1950
A. R. THOMPSON
2,526,712
CONTINUOUSLY ROTATING TURRETS WITH PEAR
PEELING, CORING, AND SPLITTING MEANS
Filed April 14, 1939
15 Sheets-Sheet 1
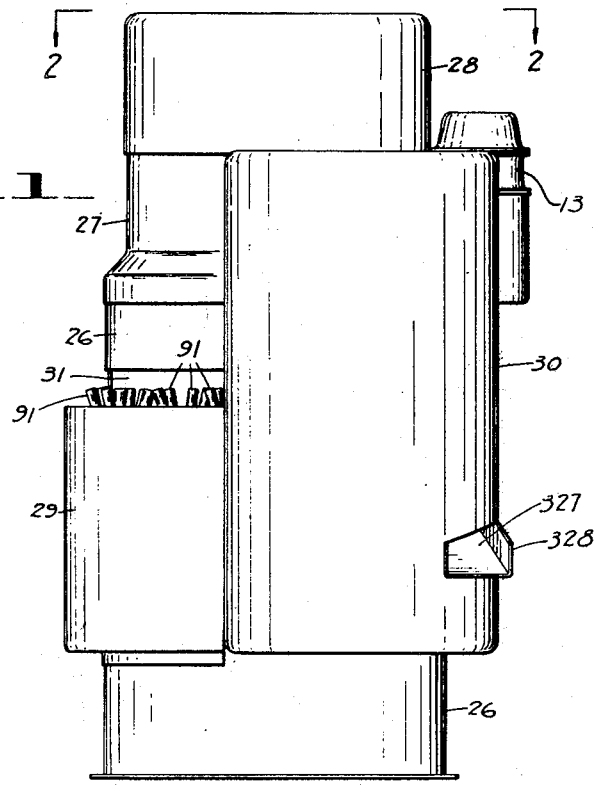
FIG_1_
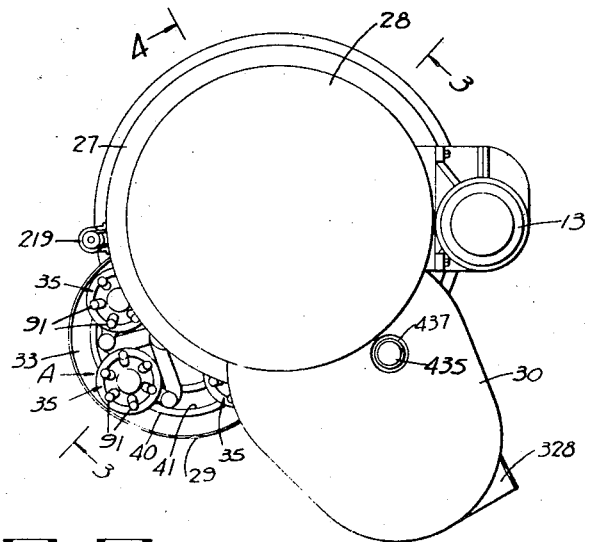
FIG_2_
INVENTOR
ALBERT R THOMPSON
BY Philip A. Minnis
ATTORNEY

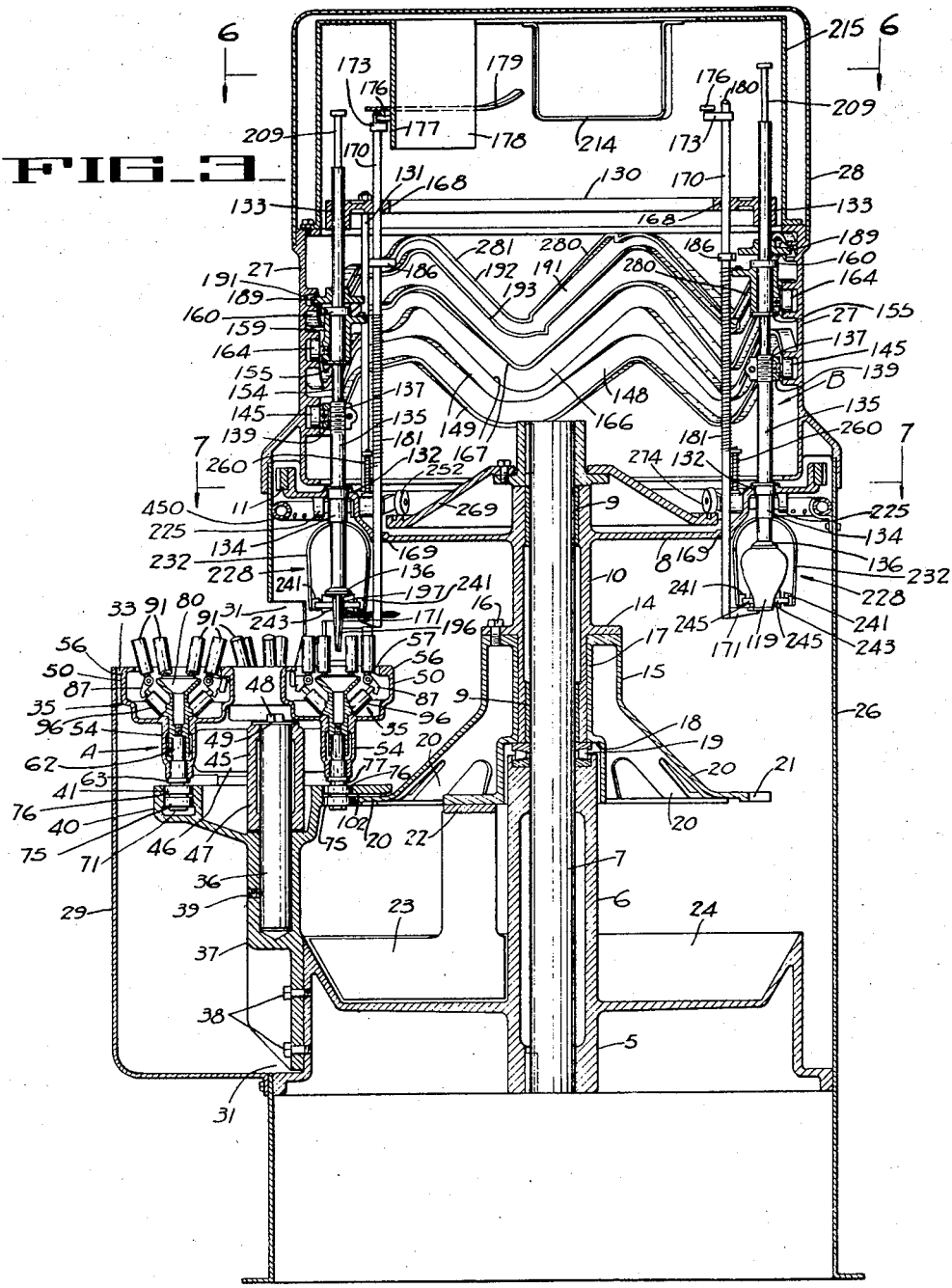

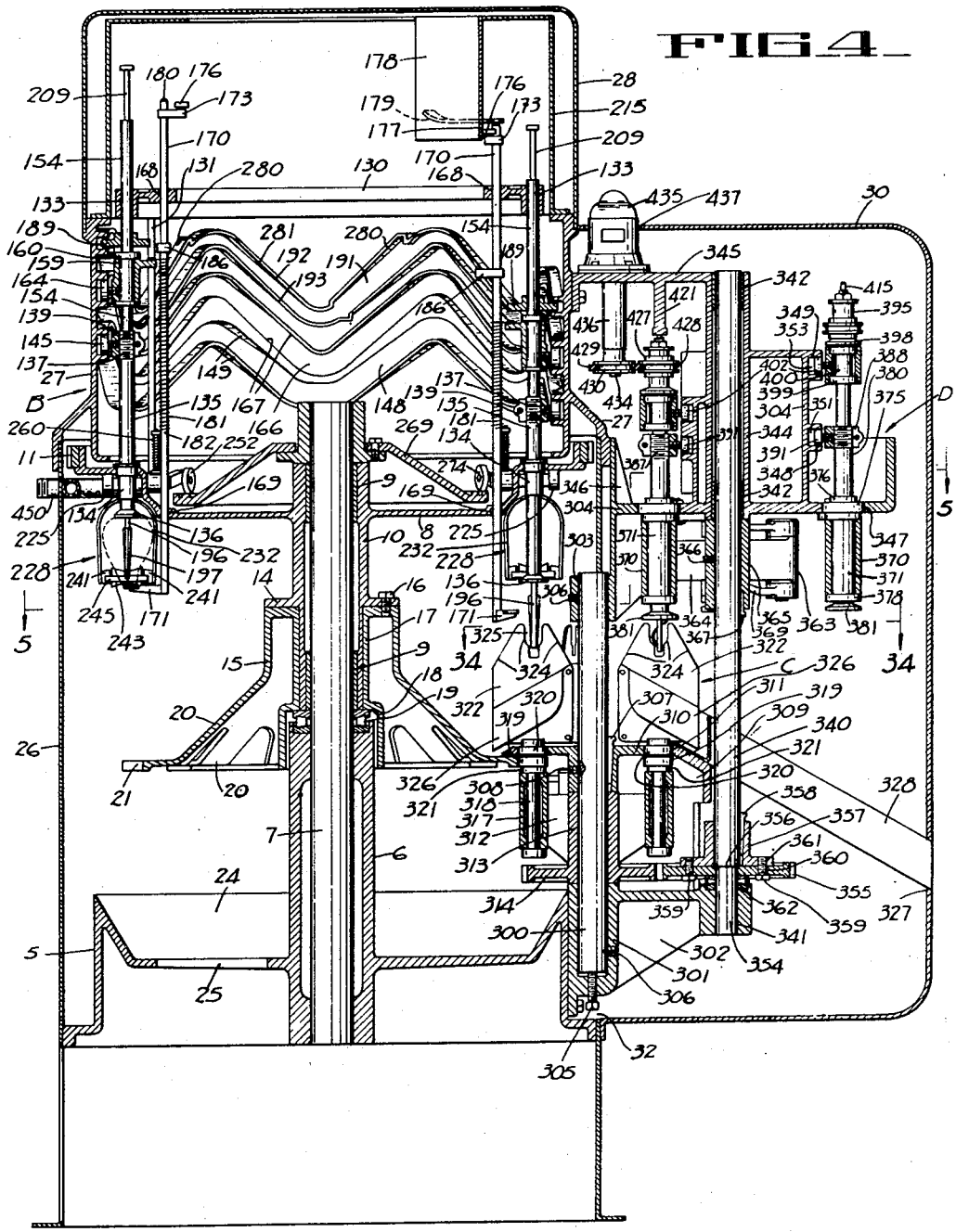

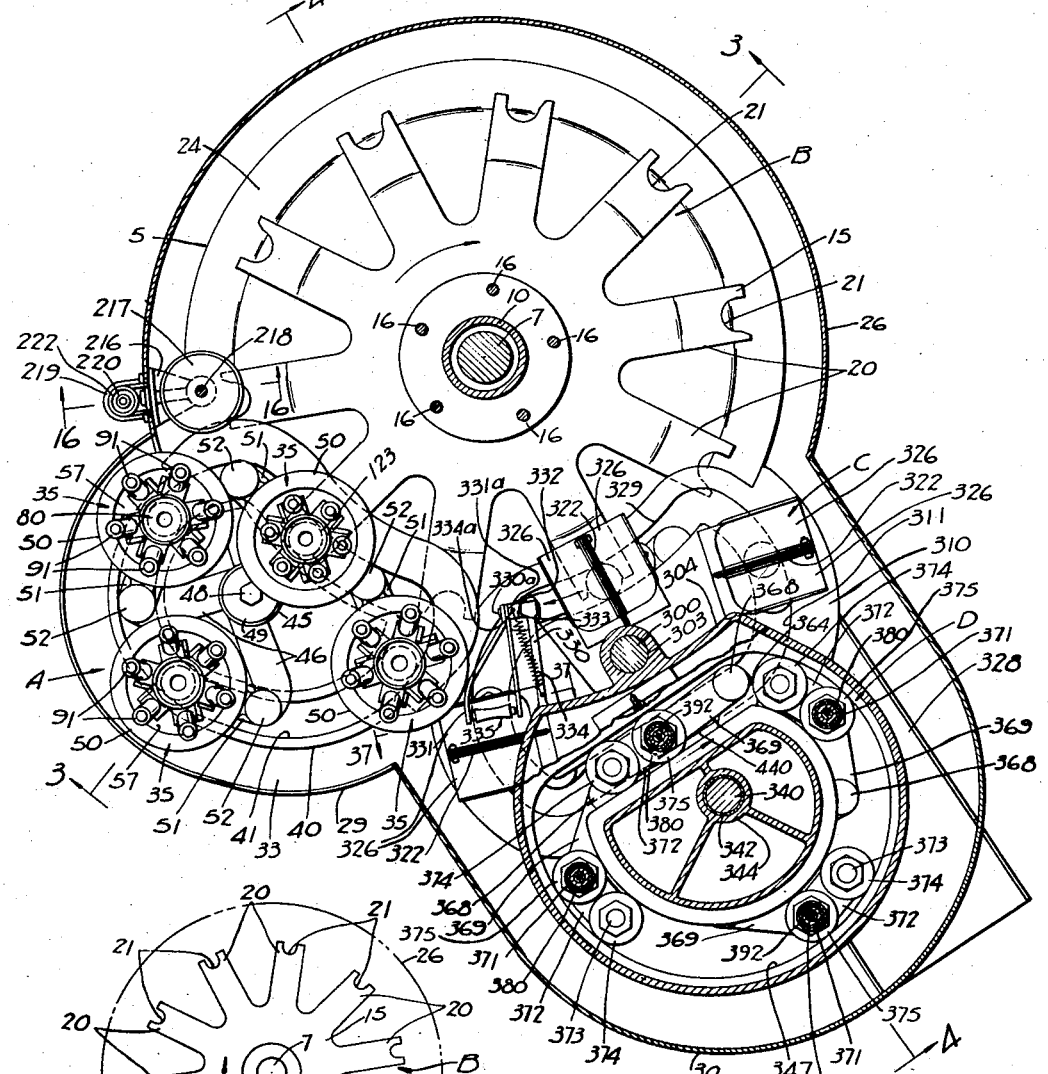

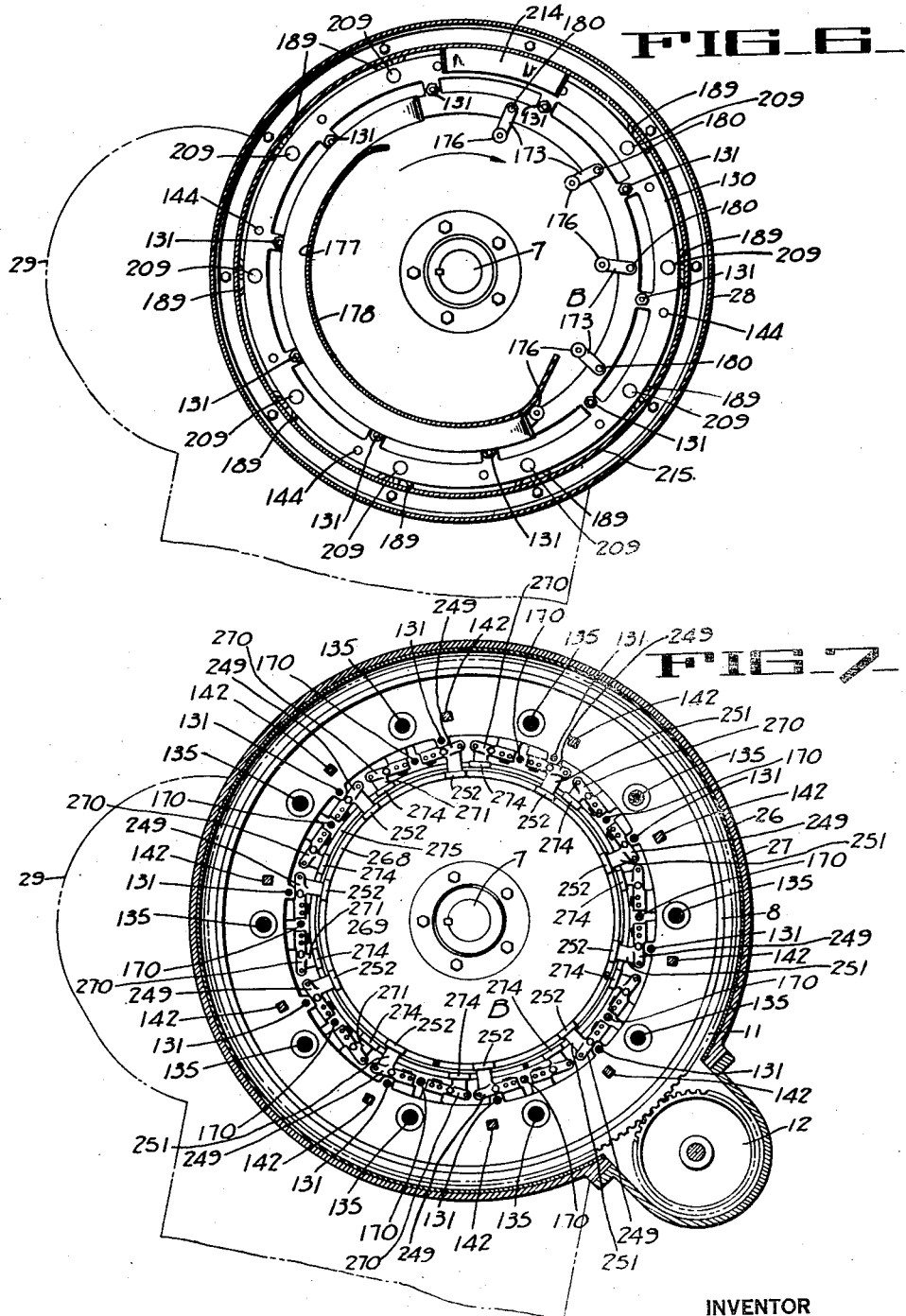

Oct. 24, 1950     A. R. THOMPSON     2,526,712
CONTINUOUSLY ROTATING TURRETS WITH PEAR
PEELING, CORING, AND SPLITTING MEANS
Filed April 14, 1939     15 Sheets-Sheet 6
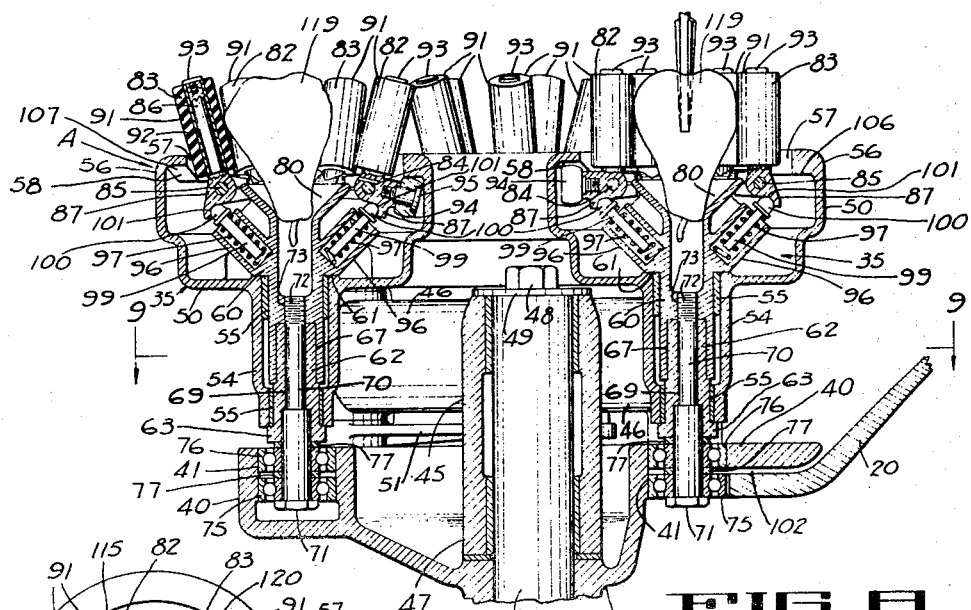
FIG_8_
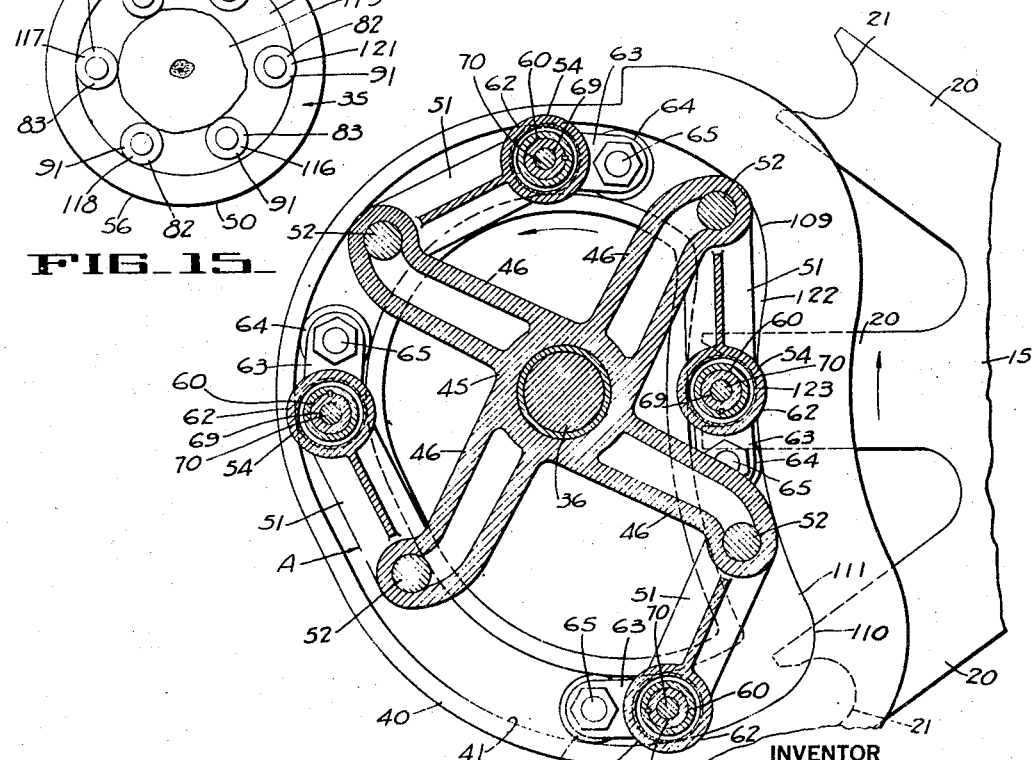
FIG_15_
FIG_9_
INVENTOR
ALBERT R. THOMPSON
BY Philip A. Minnis
ATTORNEY Oct. 24, 1950
A. R. THOMPSON
2,526,712
CONTINUOUSLY ROTATING TURRETS WITH PEAR
PEELING, CORING, AND SPLITTING MEANS
Filed April 14, 1939
15 Sheets-Sheet 7
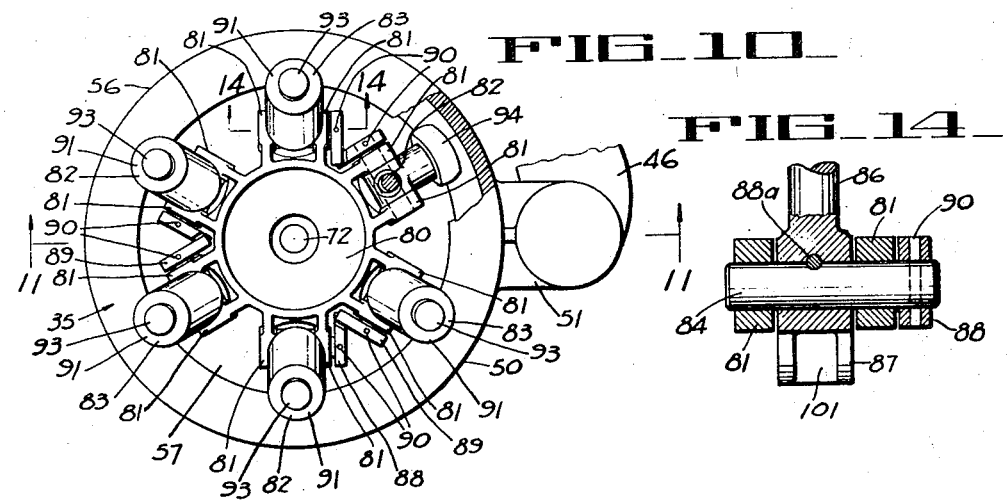
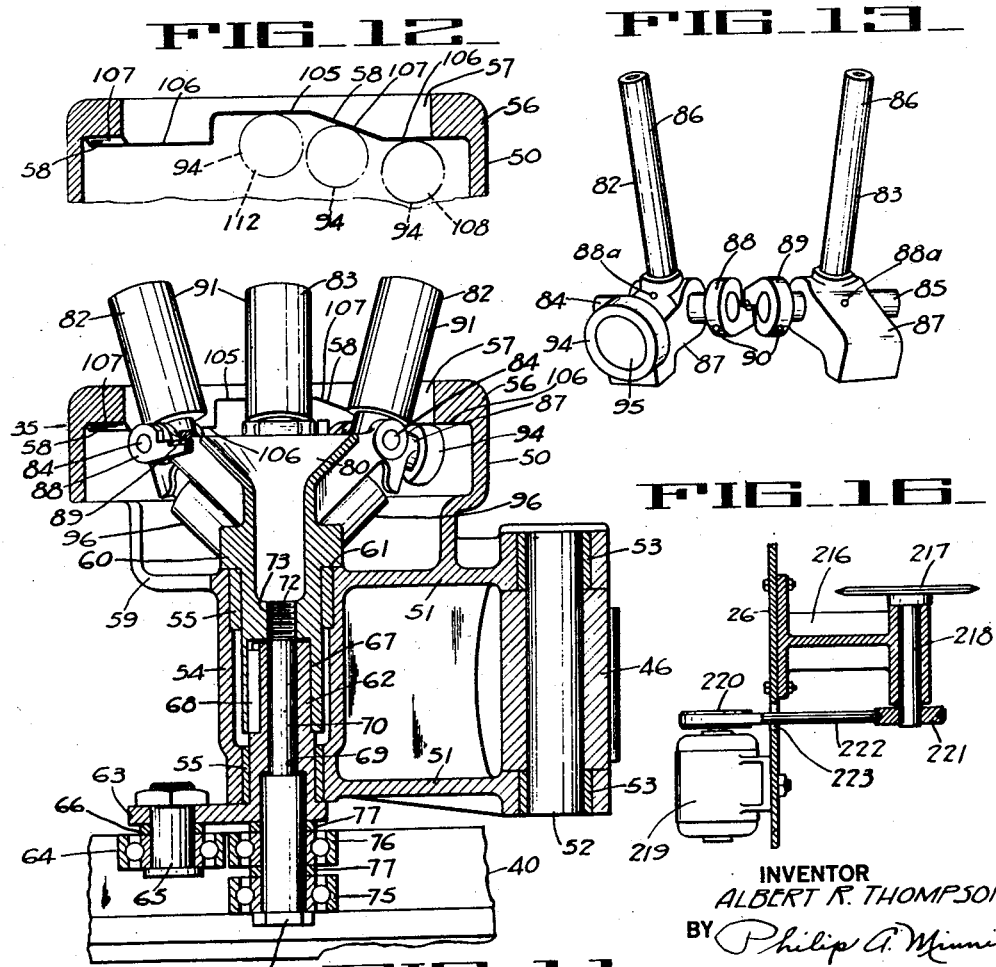
INVENTOR
ALBERT R. THOMPSON
BY
ATTORNEY

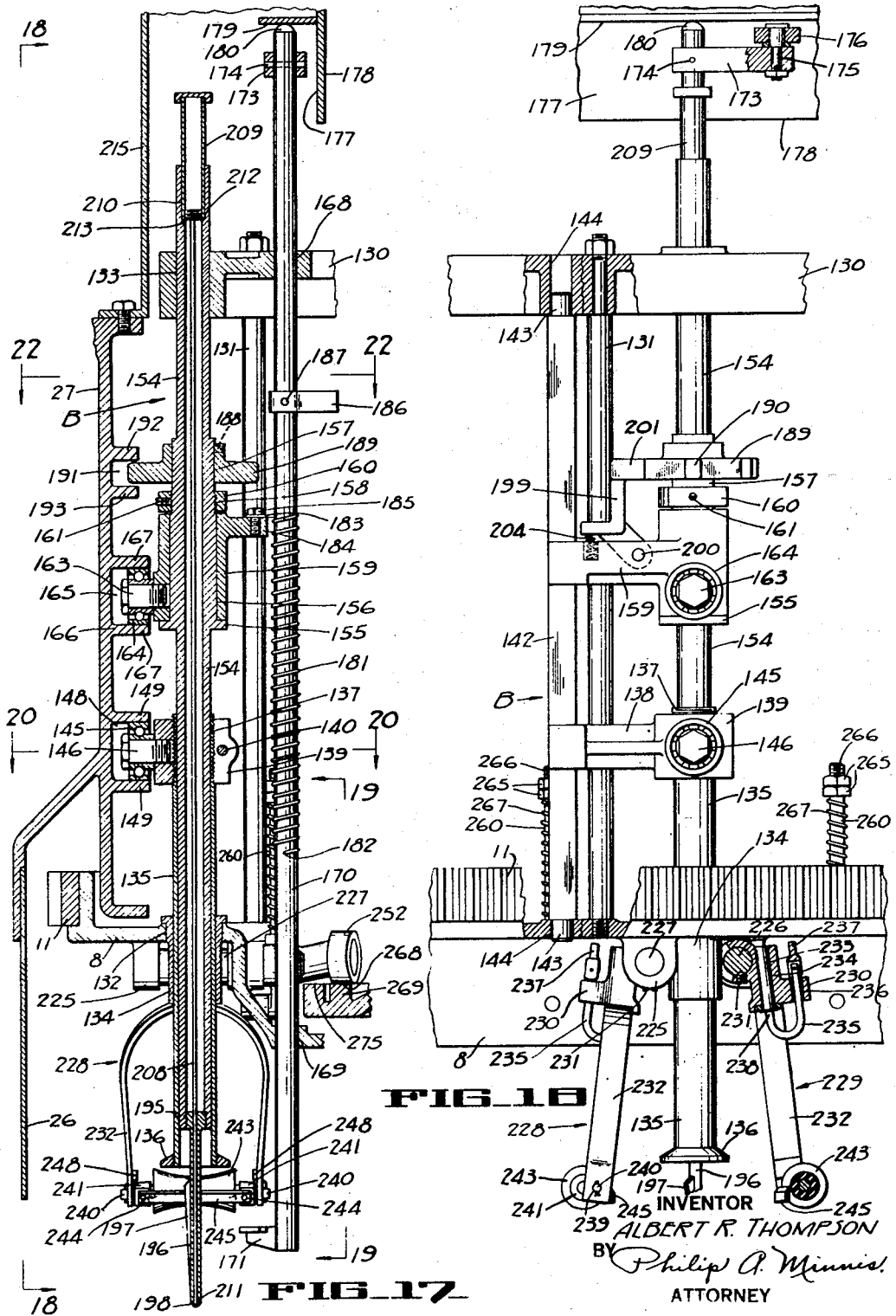

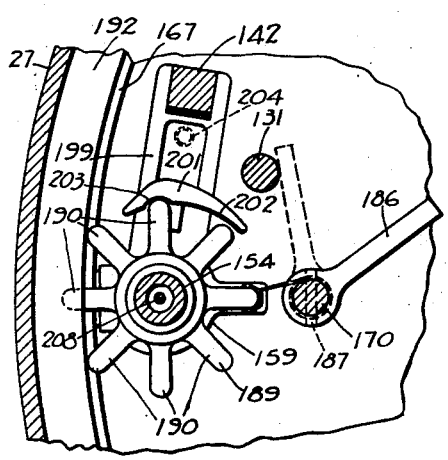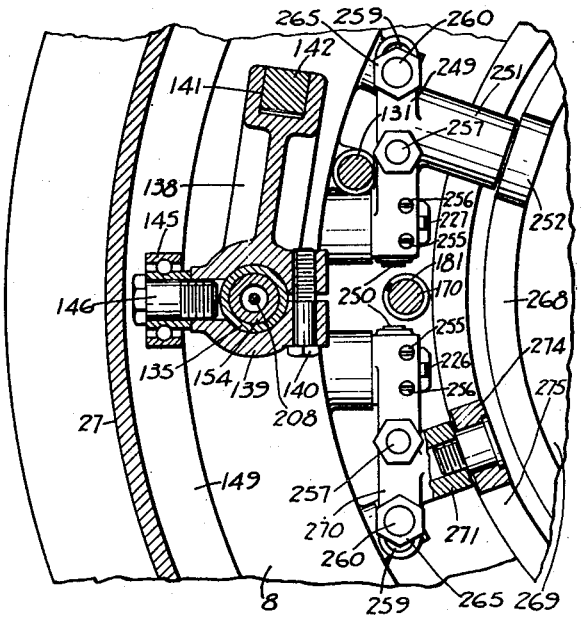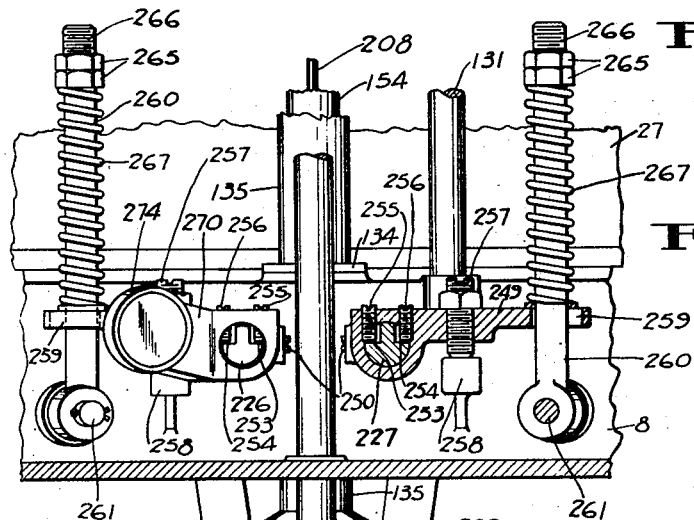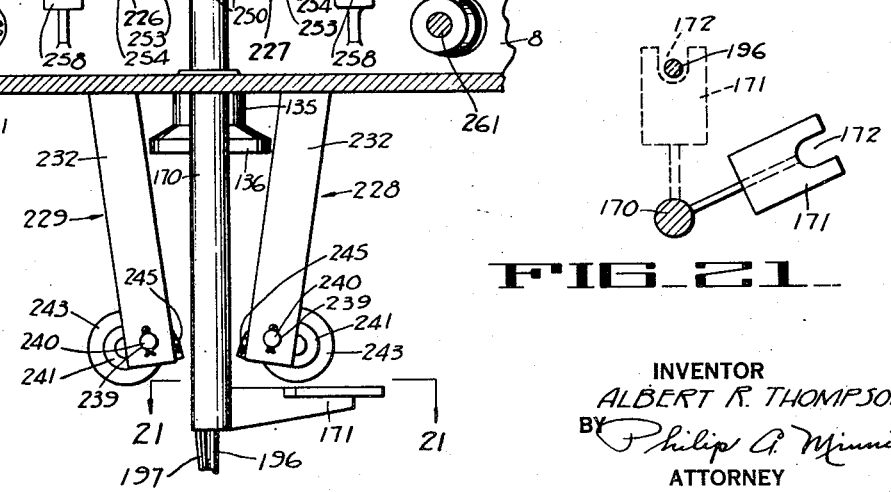

Oct. 24, 1950 A. R. THOMPSON 2,526,712
CONTINUOUSLY ROTATING TURRETS WITH PEAR
PEELING, CORING, AND SPLITTING MEANS
Filed April 14, 1939 15 Sheets-Sheet 10
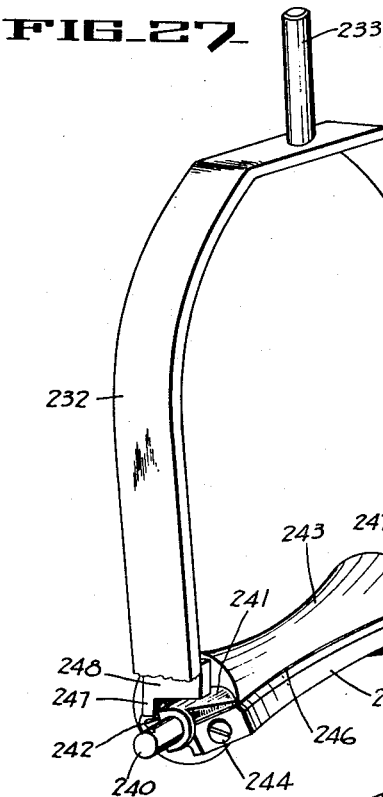
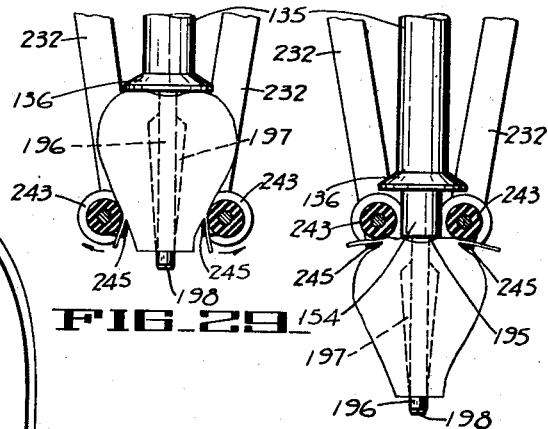
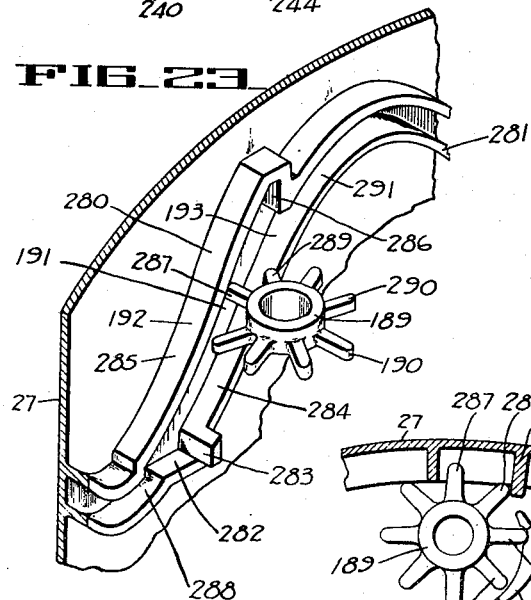
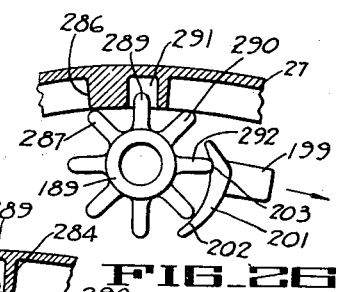
INVENTOR
ALBERT R. THOMPSON
BY Philip A. Minnis
ATTORNEY

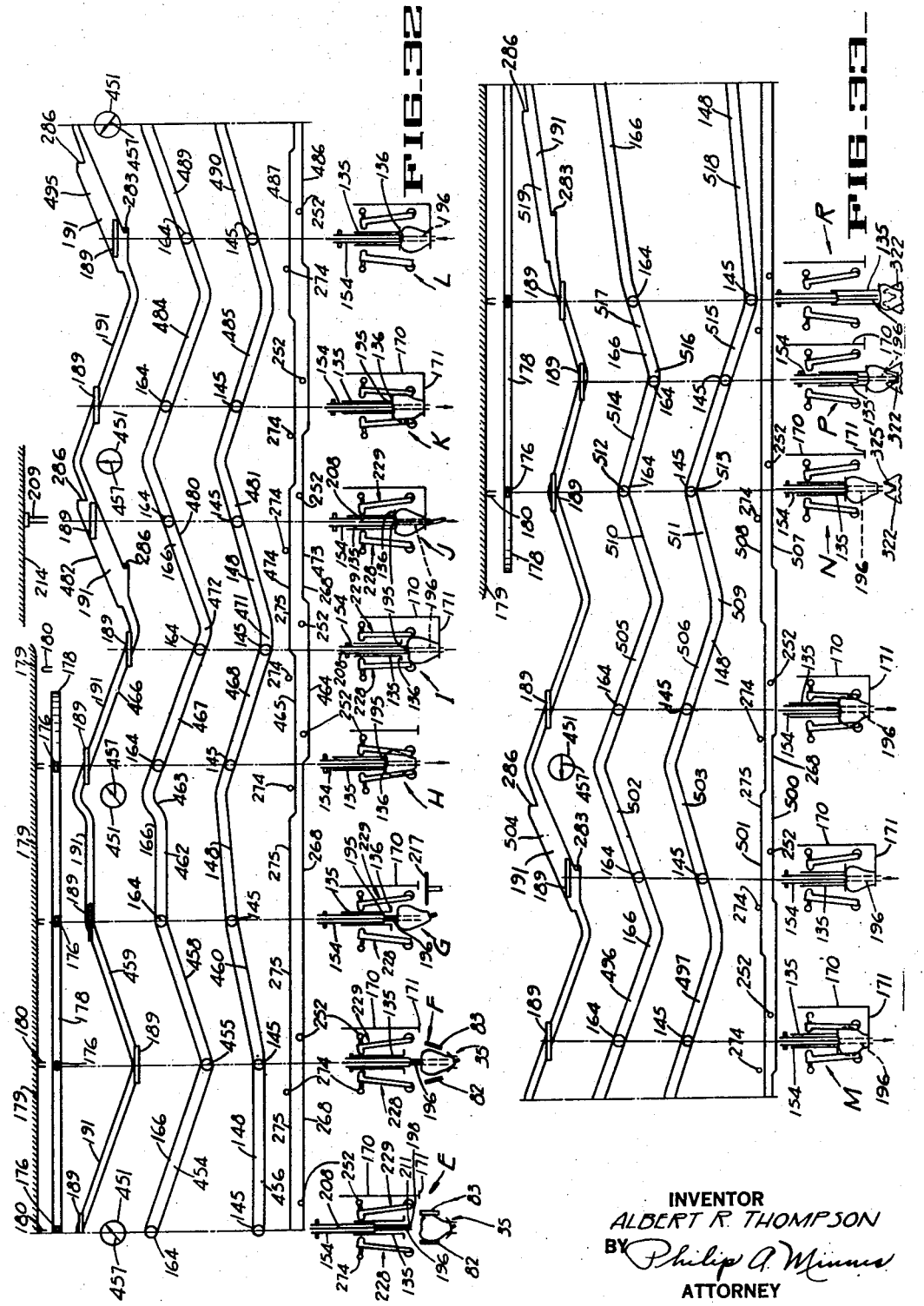

Oct. 24, 1950     A. R. THOMPSON     2,526,712
CONTINUOUSLY ROTATING TURRETS WITH PEAR
PEELING, CORING, AND SPLITTING MEANS
Filed April 14, 1939     15 Sheets-Sheet 12
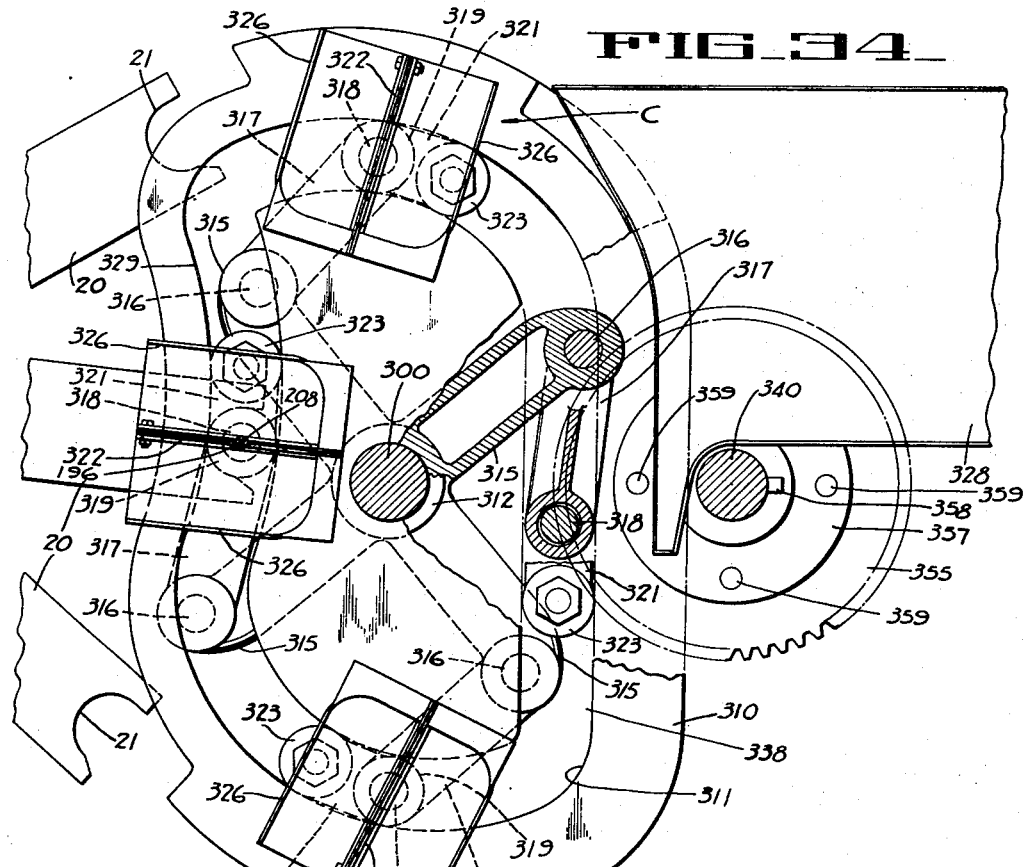
FIG. 34
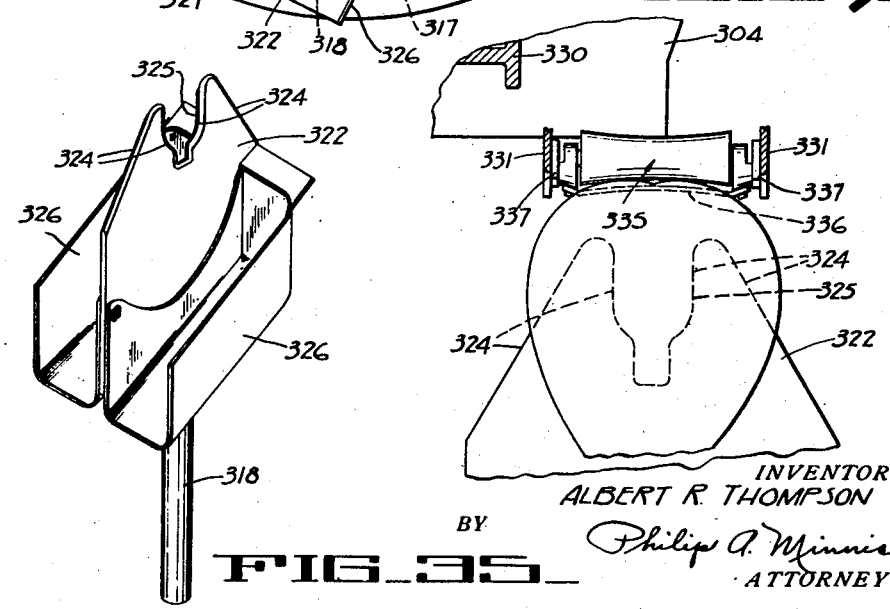
FIG. 37
FIG. 35
INVENTOR
ALBERT R. THOMPSON
BY
Philip A. Minnis
ATTORNEY

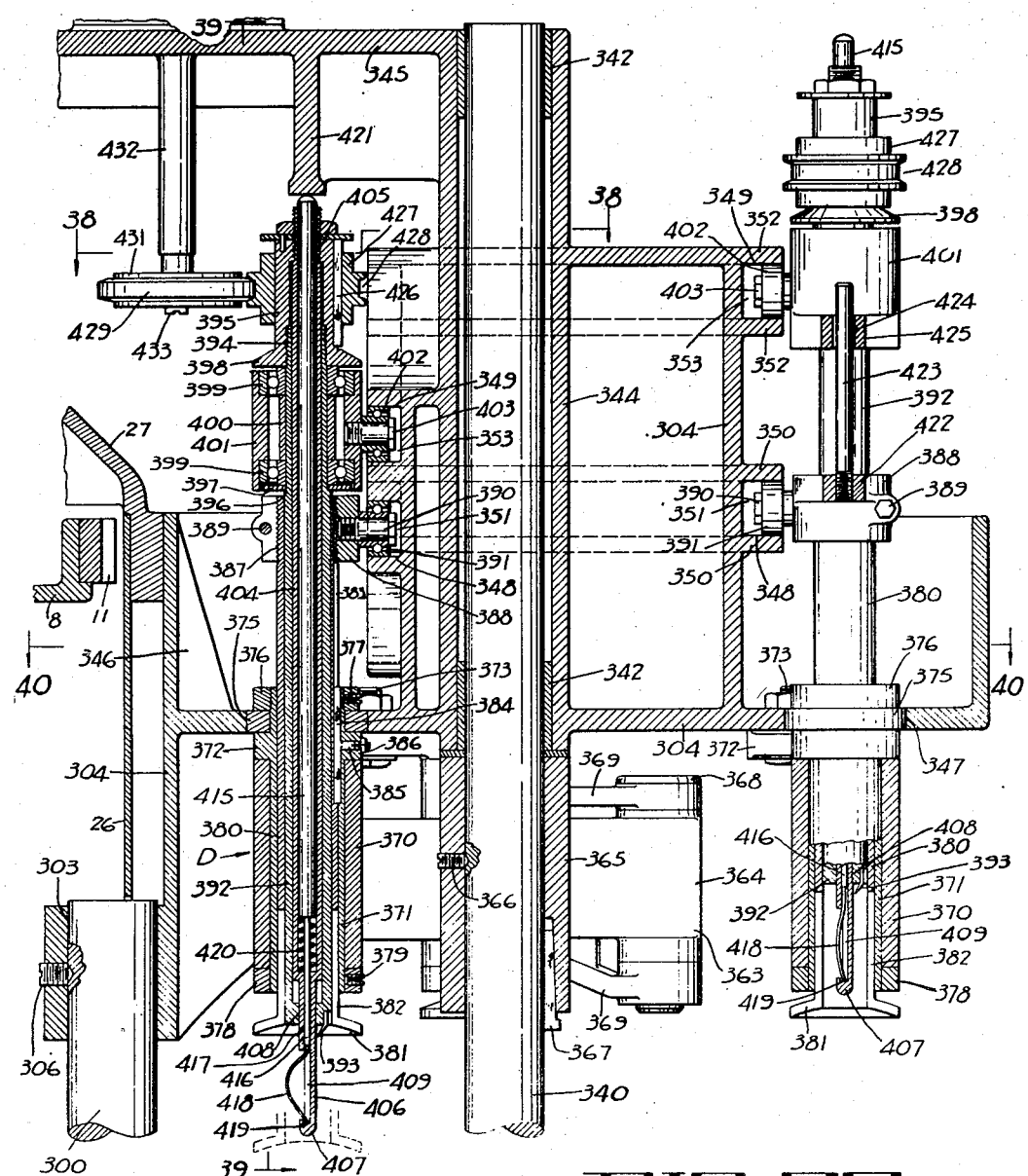
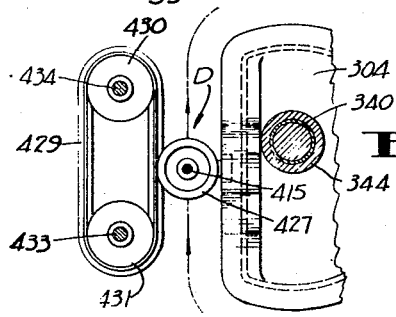
FIG. 36.
FIG. 38.
INVENTOR
ALBERT R. THOMPSON
BY Philip A. Minnis
ATTORNEY

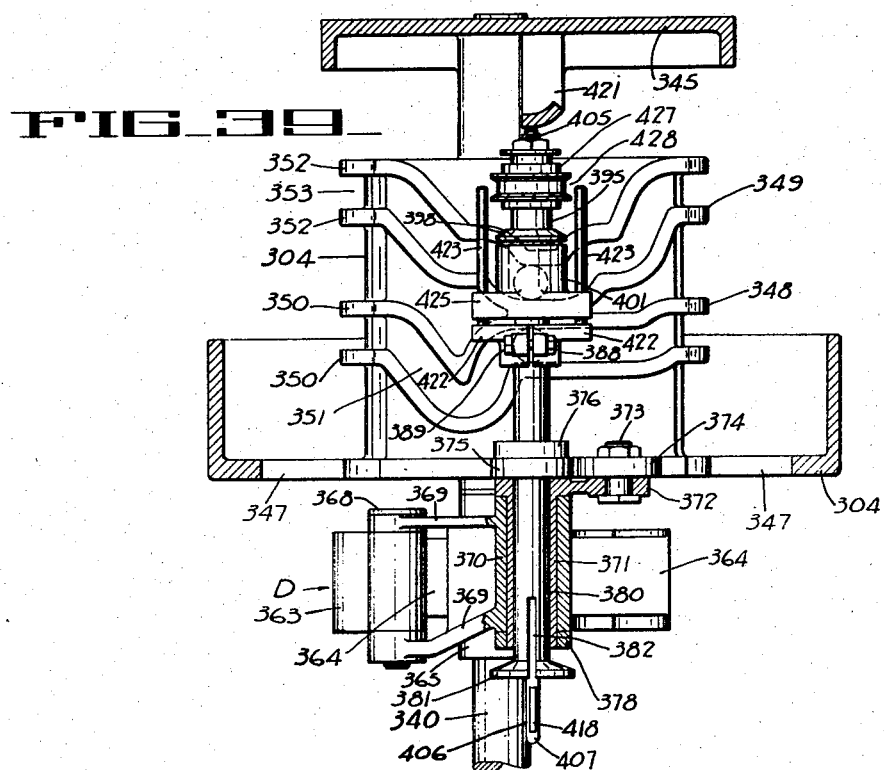
FIG_39_
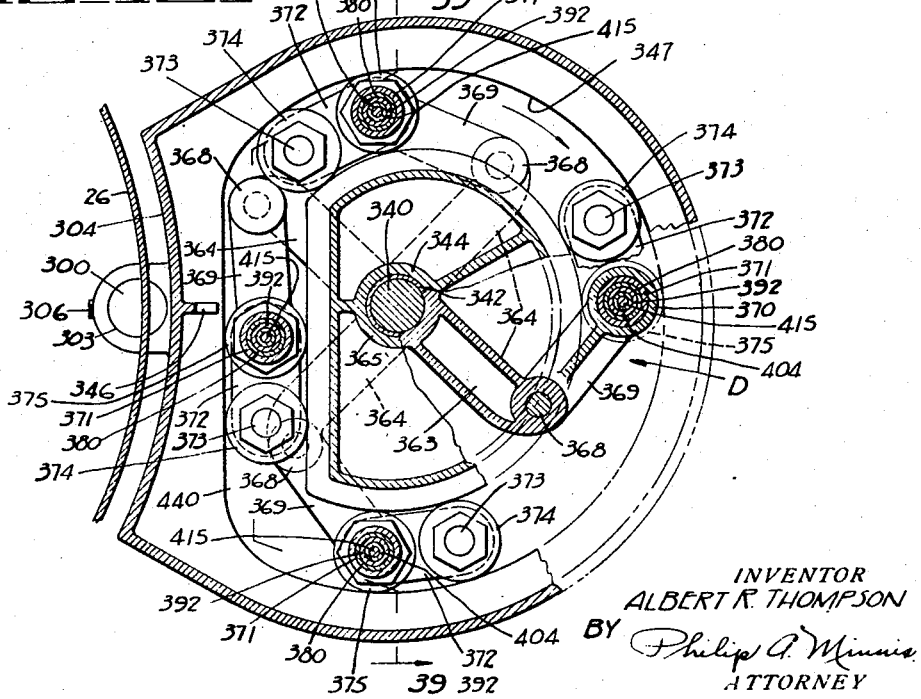
FIG_40_
INVENTOR
ALBERT R. THOMPSON
BY Philip A. Minnis
ATTORNEY

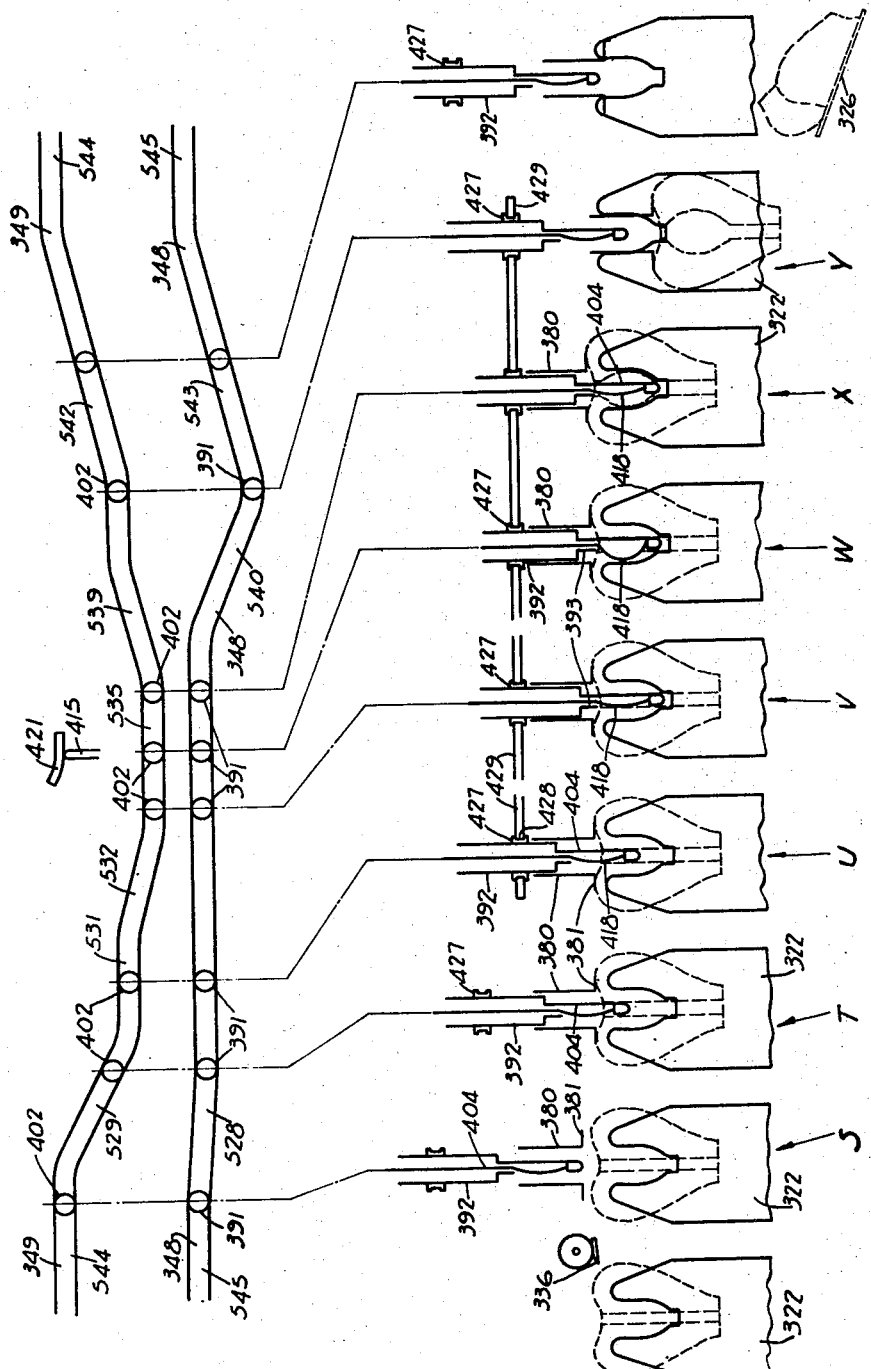

Patented Oct. 24, 1950

2,526,712

UNITED STATES PATENT OFFICE 2,526,712

CONTINUOUSLY ROTATING TURRETS WITH PEAR PEELING, CORING, AND SPLITTING MEANS

Albert R. Thompson, Los Gatos, Calif., assignor to Food Machinery and Chemical Corporation, a corporation of Delaware Application April 14, 1939, Serial No. 267,835

30 Claims. (Cl. 146—33)

The present invention relates to a machine for preparing fruit, such as pears or the like, previous to canning or drying of the same.

A primary object of the present invention is to provide an improved machine for stemming, peeling, coring, trimming, and splitting of pears, or similar fruits, in a very efficient and speedy manner.

Another object is to provide a machine of the above type for preparing fruit in a continuous cycle of operation with a resultant increase in the fruit handling capacity of said machine.

A further object of the present invention is to provide a fruit preparation machine with vertically movable fruit handling and processing means for eliminating undesirable gravitational influences during the fruit preparing operations.

A further object is to provide a fruit preparation machine of simplified compact and sturdy construction wherein all working parts are enclosed and guarded to render the same safe in operation and to eliminate undesirable splashing of fruit juice and cleaning liquid therefrom.

A further object is to provide a fruit preparation machine having a feed mechanism for feeding fruit to the machine in a continuous operation.

A further object is to provide a feed mechanism having a fruit receiving portion remotely positioned with respect to other fruit handling or processing means of a fruit preparation machine, for enabling safe and unobstructed charging of said feed mechanism.

A further object is to provide a feed mechanism for a fruit preparation machine for aligning fruit relative to stemming devices without manual intervention.

A further object is to provide a feed mechanism for automatically aligning the stem axis of fruit of various sizes and configurations and for supporting the aligned fruit for presentation and delivery thereof to stemming devices in accurately centered position relative thereto without depending upon the skill and judgment of the operator.

A further object is to provide peeling devices for performing peeling operations with uniform gravitational effect.

A further object is to provide a fruit preparation machine having vertically suspended peeling devices for providing gentle, smooth, and uniform fruit peeling operations and for facilitating the ready disposal of refuse without interference thereof with other fruit handling and processing means.

A further object is to provide an improved peeling mechanism operable by movement of the fruit with respect thereto for performing peeling operations upon the fruit following closely the contour of the same irrespective of the size and configuration of the fruit to obtain peelings of uniform size and thickness.

A further object is to provide stemming tube indexing means and peeling mechanism operating means simultaneously operable for positioning the fruit and for conditioning the peeling mechanism for operation in a predetermined relation thereto.

A further object is to provide a splitting device with a plurality of splitting blades operable in timed relation with respect to the stemming means for receiving fruit therefrom for presentation thereof to coring and trimming means.

A further object is to provide a fruit preparation machine which comprises means for coring and trimming of fruit previous to splitting of the same.

A further object is to provide coring and trimming devices for performing coring and trimming operations upon the fruit while the same is partially impaled upon the splitting device.

A still further object is to provide means for timing the operation of the coring and trimming devices relative to the operation of the splitting device.

A further object is to provide automatically operated transfer means for removing the fruit from the stemming devices onto the splitting blades for partially impaling the same thereon.

A further object is to provide an actuating mechanism for the coring and trimming devices automatically engageable therewith for operating the same upon their alignment with the fruit.

A further object is to provide an ejector mechanism operable in timed relation with respect to the splitting device for final splitting of the fruit and for discharging the same from the machine.

Other and further objects and advantages of the present invention will become apparent from the following description taken in connection with the accompanying drawings wherein a preferred embodiment of the invention has been illustrated which is especially adaptable for the preparation of pears.

In the drawings:

Fig. 1 is a side elevation of the complete machine of the present invention.

Fig. 2 is a plan view of the machine of Fig. 1.

Fig. 3 illustrates a vertical sectional view taken along the line 3—3 of Fig. 2. For purpose of clearness only two stemming and peeling units have been shown.

Fig. 4 shows a vertical section of the machine as viewed along the line 4—4 of Fig. 2, certain of the stemming and peeling units being omitted for purposes of clearness.

Fig. 5 is a cross sectional view through the entire machine taken along the line 5—5 of Fig. 4.

Fig. 6 is a cross section taken along line 6—6 of Fig. 3, certain parts being omitted.

Fig. 7 illustrates another cross sectional view taken along the line 7—7 in Fig. 3, certain parts being omitted.

Fig. 8 shows an enlarged vertical section of the feeding mechanism illustrated in Fig. 3, certain parts being broken away.

Fig. 9 is a cross sectional view of the feeding mechanism, the section being taken along the line 9—9 of Fig. 8.

Fig. 10 is an enlarged plan view of a single centering unit of the feeding mechanism, illustrating the construction and arrangement of the individual centering fingers and their cooperating parts.

Fig. 11 is a vertical section through a single centering unit of the feeding mechanism and its associated parts, the section being taken along the line 11—11 of Fig. 10.

Fig. 12 is a detail view in section of a portion of the actuating cam of the centering unit shown in Figs. 10 and 11.

Fig. 13 is a perspective view of two adjacent centering fingers and their cooperating parts.

Fig. 14 is an enlarged sectional view taken along line 14—14 of Fig. 10, showing certain details of the mounting of the centering fingers and their associated parts.

Fig. 15 is a diagrammatic view illustrating the fruit centering action of the centering fingers.

Fig. 16 is a sectional view of a portion of Fig. 5 taken on line 16—16 thereof, showing the circular trimming blade and operating means therefor.

Fig. 17 illustrates an enlarged vertical sectional view of a portion of Fig. 3 showing primarily one of the stemming and peeling units and their associated parts.

Fig. 18 shows a side elevation of Fig. 17 viewed in the direction of the arrows 18—18 thereof, the housing structure being omitted and certain parts are broken away while others are shown in section to clarify the illustration.

Fig. 19 designates an enlarged elevational view of a portion of Fig. 17 looking in the direction of line 19—19 of the same with the peeling assemblies illustrated in closed position, certain parts being shown in section and others are broken away.

Fig. 20 is a cross section of Fig. 17, the section being taken along the line 20—20 of the latter figure.

Fig. 21 illustrates an enlarged cross sectional view along lines 21—21 of Fig. 19, showing primarily the pear supporting shoe and its positions of adjustment during the operation of the machine.

Fig. 22 discloses an enlarged cross section along lines 22—22 of Fig. 17, illustrating the indexing means of a stemming unit, certain parts being omitted.

Fig. 23 is a perspective view of an indexing wheel, together with its cooperating cam structure for effecting indexing operations of the wheel.

Figs. 24-26 inclusive are somewhat diagrammatic views illustrating various positions of the indexing wheel relative to its cooperating cam structure during various phases of a complete indexing operation of the wheel.

Fig. 27 is a perspective view of one of the peeling assemblies.

Fig. 28 is a perspective view of a portion of one of the peeling assemblies shown in Fig. 27, illustrating the position of certain parts with the peeling blade in another position from that as shown in Fig. 27.

Figs. 29 and 30 show portions of one of the stemming and peeling units partially in section and partially in elevation, illustrating primarily the action of the peeling assemblies in operation.

Fig. 31 is a diagrammatic illustration of the relation and cooperative association of the various turrets of the machine of the present invention.

Figs. 32 and 33 are diagrams illustrating the operation of a portion of the machine in a schematic manner. Fig. 33 is the continuation of Fig. 32 on the right hand side thereof.

Fig. 34 is a plan view of the discharge turret of the machine viewed in the direction of line 34—34 of Fig. 4, certain parts being broken away and others are shown in section.

Fig. 35 shows a perspective view of a splitting blade and discharge troughs associated therewith.

Fig. 36 is an enlarged vertical section of the coring and calyx removing mechanism, generally disclosed in Fig. 4, certain parts being shown in elevation.

Fig. 37 is a detail view in elevation of the butt trimming knife and a portion of a splitting blade looking in the direction of arrows 37—37 of Fig. 5.

Fig. 38 is a reduced horizontal section of a portion of Fig. 36 taken along the line 38—38 thereof, illustrating the drive mechanism for rotating the coring and calyx knives.

Fig. 39 shows a vertical sectional view of the coring and calyx removing mechanism, the section being taken along the line 39—39 of Fig. 36.

Fig. 40 is a cross section of Fig. 36 along the line 40—40 thereof.

Fig. 41 is a diagram disclosing the operation of the coring, butt trimming, and splitting devices in a schematic manner.

Referring first briefly to the general construction and operation of the machine as illustrated in Figs. 1 to 5, it may be stated that the same comprises a plurality of continuously rotating turrets, operatively associated relative to each other and provided with fruit handling and processing means for performing various fruit preparing operations.

Primarily, the machine consists of a feed turret A, a main turret B, a discharge turret C, and a coring turret D, all of which are operated in timed relation with respect to each other by a single source of motive power.

The feed turret A comprises a plurality of centering devices for receiving fruits for aligning, centering, and presenting the same to reciprocable stemming devices carried by the main turret and operable for impaling the fruits thereon for removing the same from the centering devices.

The fruits impaled upon the stemming devices and supported thereby are thereupon presented to trimming and peeling devices at various stages during the rotation of the main turret which perform trimming and peeling operations thereupon.

After completion of these various operations, the fruits are transferred from the main turret to the discharge turret and are partially impaled upon splitting devices carried by the same.

During the rotation of the discharge turret the pears supported thereby are presented to coring and trimming means carried by the coring turret. With the pears partially impaled upon the splitting devices, butt trimming, coring, and calyx removing operations are performed thereupon and finally the pears are split in halves and discharged from the machine.

With the foregoing general description of the machine in mind, the construction and operation of the same will now be specifically described.

Frame structure and drive

As best seen from Figs. 1 to 5, the frame structure of the machine comprises a base 5 provided with a vertically extending boss 6 within which a stationary main shaft 7 is mounted. The shaft 7 is adapted to support a turret frame 8 rotatably mounted thereon by means of bearings 9 carried by a hub 10 integral with the turret frame structure. Secured to the outer periphery of the turret frame 8 is a ring gear 11 which intermeshes with a drive pinion 12 of an electric motor 13. (See Figs. 1, 2, and 7.)

The hub portion 10 comprises further an annular flange 14 to which a spider 15 is secured by means of screws 16. The spider 15 is provided with a hub 17 within which a portion of the hub 10 of the turret frame 8 is received for maintaining the spider in proper centered position relative to the shaft 7. Mounted on the shaft 7 and interposed between the boss 6, and the hub 10, and a shoulder 18 on the hub 17 of the spider 15 is a roller bearing assembly 19 adapted to take the vertical thrust between these parts. It will therefore be seen that upon operation of the motor 13, the ring gear 11, turret frame 8, and spider 15 will be rotated around the stationary shaft 7 in the direction of the arrow on Fig. 5.

The spider 15 is provided with a plurality of radially extending arms 20, the free ends of which are formed with semi-circular recesses 21. Attached to the spider 15 at 22 is a scraper blade 23 extending into an annular recess or trough 24 formed by the base 5. Upon rotation of the spider 15 the scraper blade 23 is rotated therewith and refuse or peelings accumulating within the trough of the base 5 are discharged therefrom through an opening 25.

While the turret frame 8 of the main turret B is secured to the ring gear 11 and rotatable therewith, the feed turret A, discharge turret C, and coring and trimming turret D are directly or indirectly driven by the spider 15, which is secured to the turret frame 8 for rotation therewith in a manner as previously stated. In this way the various turrets and operating parts are driven from a single source of power.

The housing of the fruit preparation machine consists of a cylindrical shell 26 attached to the base 5 and interconnected with a turret housing 27 enclosing operating parts of the main turret B. A removable hood 28 engageable with the turret housing 27 closes the upper portion thereof, while removable casings 29 and 30 are adapted to enclose the mechanism of the feed turret A, and the discharge turret C and coring turret D, respectively, extending from the cylindrical shell 26 through openings 31 and 32 in the same. The casing 29 is open at 33 to permit access to the feeding devices for delivery of fruit to the same.

Feed turret construction

The feeding mechanism of the machine, as best seen in Figs. 3, 5, and 8 to 14 inclusive, consists of a horizontally rotatable turret structure A which is provided with a plurality of feeding and centering devices 35 for receiving, aligning, and centering the fruit and which projects to one side of the main turret structure to enable delivery of the pears to the feeding devices without interference with other operating parts of the machine, so as to render the same safe in operation and to prevent any possible injury to the hands of an operator. The feed turret structure A is rotatably mounted upon a stationary shaft 36 supported by a bracket 37 attached to the base 5 by means of screws 38. A set screw 39 on the bracket 37 maintains the shaft 36 in position against accidental removal. The upper portion of the bracket 37 is formed into a roller guide 40 provided with a curved track 41, as clearly shown in Figs. 8 and 9.

The feed turret A (see Figs. 8 to 11) consists of a spider structure 45 having a plurality of radially extending spider arms 46 and a vertically extending hub portion 47 rotatably mounted upon the stationary shaft 36 and retained thereon by means of a lock screw 48 and washer 49. The feed turret includes further a plurality of centering devices 35 already referred to above, each of which consists of a cluster bowl 50 having horizontally extending arms 51 pivotally secured to the free ends of the spider arms 46 by means of pivot pins 52 extending through vertical bearings 53 on the arms 51. Each cluster bowl structure 50 includes further a vertical hub 54 provided with bearings 55, an upper portion forming a bowl-like casing 56 provided with a circular opening 57, a plurality of cams 58 (see Fig. 12) and an opening 59 for discharging refuse therefrom. Rotatably mounted within each cluster bowl 50 and extending partially into the hub 54 of the same is a feed cluster 60 positioned within the upper hub bearing 55 and supported thereon by a shoulder 61. A vertically extending bearing portion 62 (see Figs. 9 and 11) of a follower arm 63, provided with a follower roller 64 supported thereon by a pivot stud 65 and spaced therefrom by a spacer ring 66, is rotatably mounted within the lower hub bearing 55 and extends into a bore 67 in the lower portion of the feed cluster 60 to which it is secured by means of a key 68 for rotation therewith. The vertical bearing portion 62 of the follower arm 63 has a bore 69 for the reception of a stud 70 provided with a head 71 and a threaded end 72 for attachment to an interiorly threaded portion 73 of the feed cluster 60. Mounted upon the lower end of the stud 70 is a drive roller 75 and a centering roller 76 arranged in spaced relation with respect to each other and the follower arm 63 by means of spacing washers 77. The stud 70 retains the rollers 75 and 76, the follower arm 63, and the feed cluster 60 assembled in proper position for rotation within the cluster bowl 50.

The upper portion of each feed cluster 60 is formed into a funnel-like structure, as best seen in Figs. 8 and 11, providing a pocket 80 for the reception of the stem ends of pears or similar fruits for purposes to be explained later on. The feed cluster 60 includes further a plurality of radially extending arms 81 (see Fig. 10) arranged in pairs for supporting centering fingers 82 and 83 pivotally attached thereto by means of stud shafts 84 and 85. Each of the centering fingers 82 and 83 comprises a stud 86 and a stud arm 87 integral therewith and secured to its respective stud shaft by means of a pin 88a for rotation therewith. (See Figs. 8, 13, and 14.)

The centering fingers 82 and 83 arranged in pairs on the feed cluster 60 are cooperatively interconnected by means of actuating arms 88 and 89, fixed to their respective stud shafts 84 and 85 for rotation therewith by means of pins 90. Rotatably mounted upon the studs 86 are rollers 91 provided with bearings 92 extending over the entire length of the same. Cap screws 93 secured to the upper end of the studs 86 retain the rollers 91 thereon and prevent displacement thereof during the operation of the machine.

The stud arm 87 of each one of the centering fingers 82 carries an actuating roller 94 rotatably mounted upon a pivot pin 95 threadedly secured to the stud arm 87. The rollers 94 are adapted to cooperate with the cams 58 for controlling opening and closing of each pair of cooperating centering fingers in a manner to be specifically described later on.

The feed cluster 60 includes, furthermore, a plurality of cylindrical spring pockets 96 (see Fig. 8) within which helical springs 97 are positioned. Interposed between the springs 97 and the stud arm 87 of each centering finger are plungers 99 provided with rounded pressure heads 100 engaging complementary sockets 101 of the stud arms 87. The springs 97 are so arranged as to urge the centering fingers to closing position.

The drive roller 75, centering roller 76, and the follower roller 64 extend into the track 41 of the roller guide 40, as clearly seen from Figs. 3, 8, and 11, for controlling the rotative movement of the feed cluster 60 relative to the cams 58 during the rotation of the feed turret A. The lower portion of the roller guide 40 adjacent the spider 15 is cut away at 102 to permit the entrance of the spider arms 20 into the roller guide track 41 for engagement with the drive rollers 75. It will, therefore, be seen that during rotation of the spider 15 in a clockwise direction the spider arms 20 enter the roller guide track 41 in such a manner that the drive rollers 75 are received within the recesses 21 of the spider arms 20 in a successive manner and are shifted thereby along the roller guide in a counterclockwise direction as viewed in Figs. 5 and 9. In this way the feed turret is continuously rotated for presenting the centering devices to the operating parts of the main turret and to effect operation of the centering fingers for performing fruit aligning and centering functions.

The cams 58 on the cluster bowl 50 (see Figs. 11 and 12) consist each of an upper horizontal surface 105, a lower horizontal surface 106, and an inclined surface 107 interposed therebetween. The feeding devices comprise preferably three pairs of centering fingers 82 and 83, and the cluster bowl 50 is therefore provided with three cams 58, one for each of the rollers 94 of the three centering fingers 82. The springs 97 maintain the rollers 94 of the centering fingers 82 in contact with their corresponding cams 58.

When the rollers 94 assume a position as indicated at 108 in Fig. 12, engaging the lower plane 106 of their respective cams, the stud arms 87 are forced downwardly to compress the springs 97, and the centering fingers 82 are moved outwardly to their fruit receiving or open position. Due to the fact that the centering fingers 83 are operatively interconnected with the centering fingers 82 by means of the actuating arms 88 and 89, the above described opening action of the centering fingers 82 causes a corresponding opening action of the centering fingers 83, so that with the rollers 94 in a position as shown in Fig. 12 at 108, all of the centering fingers are simultaneously spread apart to open or fruit receiving position.

The centering fingers of each cluster are maintained in their fruit receiving or open position during the travel of their corresponding cluster bowl (see Fig. 9) from approximately the point 109 to approximately 110 of the roller guide 40, during which time the cluster bowl 50, the feed cluster 60, and follower arm 63 are held in such relation to each other as to maintain the centering fingers in fruit receiving position. If the relative position between these parts, however, is changed, which happens when the centering roller 76 and follower roller 64 enter into the portion 111 of the roller guide track 41 during the rotation of the feed turret A, the feed cluster 60 and cluster bowl 50 are rotated relative to each other due to the change of the angular relation between the follower arm 63, cluster bowl 50, and arm 51. The rollers 94 of the centering fingers 82 are therefore urged upwardly by the action of springs 97 during relative rotation of the feed cluster bowl 50 and feed cluster 60, along the inclined portions 107 of cams 58 until they reach a position as shown at 112 in Fig. 12, where they engage the upper plane 105 of the cams. This obviously causes gradual closing of the centering fingers 82 and 83.

When the centering fingers 82 and 83 are in fruit receiving position, which is the case during their travel from point 109 to 110 of the roller guide track 41, the operator inserts a fruit, stem end first, into the pocket 80 of each passing centering unit 35. Upon further movement of the centering units along the portion 111 of the track 41 toward the stemming devices, the feed cluster bowl 50 and the feed cluster 60 of each unit are rotated relative to each other to effect gradual closing of the centering fingers thereof under the influence and control of the springs 97, rollers 94 and cams 58 in a manner as specifically described hereinbefore.

During the closing of the centering fingers the pears, with their stem ends positioned in the pockets 80, are engaged thereby and aligned with their stem axes in a vertical position and accurately centered relative to the stemming devices of the main turret B. This action is illustrated in Fig. 8.

While the centering fingers 82 move to closing position, the centering fingers 83 may or may not move in unison with the same, due to the fact that the cooperative interconnection between the centering fingers 82 and 83, consisting of the actuating arms 88 and 89, permits the centering fingers 83 to close somewhat after the centering fingers 82 if irregularities in the fruit to be centered compel such operation. However, the centering fingers 83 cannot close ahead of the centering fingers 82, as the actuating arm 89 partially overlies the actuating arm 88 and does not permit, therefore, such operation. This offers distinct advantages during the fruit centering operation and makes the centering devices adaptable to perform accurate centering of the stem axes of pears which frequently have a rather irregular configuration.

It has been previously stated herein that the centering fingers 82 and 83 are provided with rollers 91, and it may here be mentioned that the same perform a rather important function during the fruit centering operation.

Referring now to Fig. 15, which diagrammatically illustrates the fruit centering operation, it will be seen that a pear 119 inserted into the pocket 80 of a centering unit 35 may assume a position, as shown at the left in Fig. 8, leaning toward one side and contacting certain centering fingers while considerably spaced with regard to others, and upon closing of the fingers 82 and 83 a condition as shown in Fig. 15 may result where the pear is rather firmly held between the fingers 115 and 116 considerably out of centered position. However, in view of the fact that the rollers 91 of the fingers 115 and 116 are freely rotatable, the fingers 117 and 118 will readily shift the pear 119 toward the fingers 120 and 121 during the final closing action and a perfect centering of the pear is obtained. In other words, the rollers 91 eliminate any undue friction between the centering fingers and the pear so that the same may be freely shifted to a centered position.

It will therefore be seen that no manual intervention on the part of the operator is necessary to obtain an accurate aligning and centering of the pears, and therefore all that the operator has to do is merely to place or drop the pears, stem end first, into the pockets 80. The properly centered pears, which are now firmly held by the centering fingers in aligned position, are presented during further movement of the centering fingers along the guide track 41 to stemming tubes of the main turret B, to which they are transferred by impalement thereon in a manner as will be specifically described with reference to the construction of said main turret.

During the stemming operation of the stemming tubes and while the same move in a path congruent to the path of the centering devices the centering units continue their movement along the track 41 toward point 109 thereof, and the centering fingers begin to open and will have sufficiently opened at the point 122 of their travel, at which the paths of movement of the centering units 35 and the stemming tubes 196 begin to divert, to permit removal of the impaled pears from the centering units. To be more specific, when the centering units 35 are in a position as shown at 123 in Fig. 9, the stemming tubes of the main turret will begin their impaling operation, which is completed during the travel of each centering unit from position 123 to point 122, and at this point the centering fingers are far enough open so as to release fruits of maximum diameter to be handled by the machine. This completes the entire cycle of operation of the feed turret, which repeats thereupon and continues during the rotation of the feed turret for successive presentation of fruits to the stemming devices of the main turret.

Main turret construction

The main turret structure B, as best seen in Figs. 3, 4, 6, 7, and 17 to 24, consists of the turret frame 8, rotatably mounted upon the shaft 7, and a turret bearing ring 130, which is secured to the turret frame 8 in spaced relation by means of vertical spacing rods 131. The turret frame 8, which has been partially described hereinbefore, is provided with a plurality of openings 132 arranged near the periphery thereof at equal distances from the longitudinal axis of the shaft 7 and equally spaced with respect to each other. The turret bearing ring 130 is likewise provided with a plurality of openings 133, positioned so as to register with the openings 132 in the turret frame. Arranged within each pair of congruent openings 132 and 133 of the main turret structure are fruit supporting and impaling means associated with peeling devices carried by the turret frame. The fruit supporting and impaling means cooperate with certain guide and spacing rods positioned between the turret frame 8 and the turret bearing ring 130. In the following description, reference will be made only to a single stemming and peeling unit and its associated parts, but it must, of course, be understood that the main or peeling turret carries a plurality of the same, ten in all in the embodiment shown, as will be clearly seen from the drawings. However, in view of the fact that all of these devices are of exactly the same construction, the description of one is deemed to suffice for all.

Each of the openings 132 (see Fig. 17) is adapted to receive a bearing 134 for slidably supporting a transfer tube 135 in accurate vertical position. The transfer tube 135 carries at its lower end a head 136 preferably threadedly connected thereto, and the upper portion of the tube is threaded as shown at 137 for the reception of a guide arm 138 (see Figs. 17, 18, and 20) provided with an interiorly threaded hub 139. The hub 139 is preferably slotted and formed in the fashion of a clamp provided with a clamping bolt 140 for locking the same against accidental displacement upon the transfer tube 135. The guide arm 138 comprises further a slot 141 adapted to receive a guide rod 142 of square configuration in cross section. The guide rod 142 is rotatably mounted in accurate vertical position by means of bearing studs 143 within bearings 144 of the turret frame 8 and turret bearing ring 130 respectively.

Attached to the hub portion 139 of the guide arm 138 by means of a roller stud 146 is a roller 145 which is adapted to travel within the cam way of a track type cam 148 comprising cam tracks 149. The cam 148 forms an integral part with the turret housing 27 previously referred to.

Slidably mounted within the transfer tube 135 and opening 133 of the turret bearing ring 139 is an index tube 154 provided with a shoulder 155, offset portions 156, 157 and a threaded section 158 therebetween. The portion 156 forms a bearing surface for receiving an index tube guide arm 159 retained thereon by means of an interiorly threaded retaining collar 160 secured to the threaded section 158 of the index tube and locked thereon by means of set screw 161. It should further be noted that the index tube 154 is freely rotatable within the guide arm 159 to permit indexing operations of the index tube specifically referred to later on. The guide arm 159 carries further by means of a stud 163 a roller 164 arranged within a cam way 165 of a stemming tube cam 166 comprising cam tracks 167. The stemming tube cam 166 forms also an integral part with the turret housing 27 in a similar manner to that of the transfer tube cam 148.

Positioned adjacent the index tube 154 and slidably mounted within bearings 168 and 169 of the turret bearing ring 130 and turret frame 8 respectively is a support rod 170. This support rod is rotatable and slidable within its bearings 168 and 169 and extends a considerable distance above the turret bearing ring 130 and below the turret frame 8. The lower end of the support rod 170 is provided with a fruit support 171, a detail of which is shown in Fig. 21. The pear support 171 is recessed as shown at 172 in Fig. 21 for purposes to be explained later on. The upper end of the support rod 170 carries an actuating arm 173 fixed thereto by a pin 174, and attached to this arm by means of a stud shaft 175 is a roller 176 adapted to engage, at certain stages in the operation of the machine, a vertical cam surface 177 of a cam 178. The cam 178 includes also a horizontal cam surface 179 adapted to cooperate with the upper end 180 of the supporting rod 170 to effect vertical movement of the supporting rod, while the actuating arm 173, roller 176, and cam surface 177 control the rotative movement of the supporting rod 170 for swinging the fruit support 171 out of operating position at predetermined intervals during the rotation of the main turret. The center portion of the support rod 170 is provided with a combination tension and torsion coil spring 181 secured thereto with one of its ends at 182 and attached with its opposite end 183 to a boss 184 carried by the index tube guide arm 159 by means of a screw 185. The spring 181 is so calibrated as to suspend the rod 170 in proper position and to effect upward movement of the same to assure a sufficient supporting contact between the fruit support 171 and the stem end of the pear, or similar fruit, irrespective of the size of the fruit, for retaining the same in proper position on the stemming tube.

Attached to the support rod 170 is further a limit arm 186 fixed thereto for rotation therewith by a pin 187. The limit arm 186, as clearly shown in Fig. 22, is adapted to abut against the spacing rod 131 to limit the rotation of the support rod 170 in one direction under the influence of spring 181. Rotation of the rod in the other direction is effected by the actuating arm 173 and roller 176 engaging the cam surface 177 as previously mentioned.

Secured to the index tube 154 somewhat above the retaining collar 160 by means of a set screw 188 is an index wheel 189 provided with a plurality of index fingers 190 extending into the cam way of an index cam 191, which includes cam tracks 192 and 193. The index cam 191, like the cams 148 and 166, is an integral part of the turret housing 27. The purpose of the index wheel 189 and its cooperating index cam 191 is to cause certain indexing operations of the index tube 154, and its function will be specifically described in reference to the operation of the main turret.

Removably threaded into the lower end 195 of the index tube 154 (see Fig. 17) is a stemming tube 196 having fins 197. The lowermost end 198 of the stemming tube 196 is sharpened so as to facilitate impaling of the calyx ends of pears with the inside stem portion thereof entering the tube in a manner as will be obvious to those skilled in the art.

The index tube guide arm 159, as best seen from Figs. 18 and 24 to 26 inclusive, carries a latch arm 199, pivotally secured thereto by a pivot pin 200, having a latch 201 provided with a curved face 202 and a notch 203. Interposed between the latch arm 199 and the index tube guide arm 159 is a coil spring 204 which urges the latch 201 into engagement with the fingers 190 of the index wheel 189. The function of the latch 201 is to hold the index wheel 189 in properly adjusted position when one of its fingers 190 engages the notch 203 during the indexing operations of the wheel.

Extending through the center of the index tube 154 and into the stemming tube 196 is a stem ejector consisting of an ejector rod 208 attached to an ejector head 209 slidably arranged within an enlarged cylindrical recess 210 of the index tube. The entire stem ejector structure is readily movable in a vertical direction within the index tube and the stemming tube, and is normally, under the influence of its own weight, in such a position that the lowermost ejector rod end 211 is flush with the lower end 198 of the stemming tube 196. In this instance, the shoulder 212 of the ejector head 209 will rest against a shoulder 213 within the index tube 154.

During impalement of a pear, when the stem portion of the same enters the stemming tube 196, the core ejector rod 208 and the ejector head 209 are shifted upwardly to the extent of the length of the core received within the stemming tube, and a cam 214 (see Fig. 3) mounted to a cam support 215 secured to the turret housing 27 is therefore provided to engage the ejector head 209 at a certain stage during the operation of the main turret to force the same and the ejector rod 208 downwardly to cause ejection of the stem from the stemming tube.

Mounted inside the housing 26 of the main turret, adjacent its intersection with the feed turret casing 29, by means of an arm 216, (Figs. 5 and 16) is a circular stem-end trimming blade 217. The blade 217 is rotatably supported by a shaft 218 driven by a motor 219 over the pulleys 220, 221, and belt 222. The drive belt 222 extends through an opening 223 in the housing 26. The blade 217 is arranged in such a manner relative to the lower end of the stemming tubes 196 that the same clear the blade during the rotation of the main turret, but if a pear is impaled thereon, they will present the stem end thereof to the blade 217 for trimming of the stem end of the pear.

The main turret housing 27 which carries the various cams 148, 146, and 191 is of cylindrical configuration, and these cams form continuous camways within which the rollers 145, 164, and the index wheel 189 travel during the continuous rotation of the main turret. The stemming tube cam and its cooperating roller 164 cause downward movement of the stemming tube 196 at the moment a fruit is presented thereto by a centering unit of the feed turret in properly centered position for performing the stemming operation, thereby impaling the fruit upon the stemming tube. It should furthermore be noted that during the impaling operation above referred to, due to the configuration of the roller guide 40, the centering unit and stemming tube travel in a congruent path. Upon subsequent diversion of the paths of the centering unit and stemming tube during the continuous rotation of the feed turret A and the main turret B, the centering fingers open and the stemming tube with a pear impaled thereon is lifted out of the centering unit. The pear, supported upon the stemming tube and held against rotation relative thereto by means of the fins 197, travels thereupon past various stages during the rotation of the main turret at which the peeling operations are performed.

Mounted within the turret frame 8 and ears 225, adjacent the bearing 134, by means of shafts 226 and 227 are opposing peeling assemblies 228 and 229, each of which comprises a bracket 230 fixed to the shaft 226 or 227 respectively for rotation therewith by means of set screws 231. The shafts 226 and 227 are freely rotatable within the ears 225 and the turret frame 8 to permit rotation of the brackets 230 relative to their supporting structure. Carried on each bracket 230 as clearly shown in Fig. 18 is a yoke 232 having a swivel pin 233 rotatably received within a bearing 234. Keepers 235 slidably arranged within the bracket 230 as shown at 236 and including thumb latches 237 are employed for retaining the yoke 232 secured in position on the bracket 230, but rendering the same instantaneously removable upon release of the thumb latches 237. When the keepers 235 are in locked position, the ends 238 thereof engage countersunk portions on the lower end of the swivel pins 233, so as to properly maintain the yokes in position but permit a swivelling movement thereof around the swivel pins 233.

Rotatably mounted within bearings 239 on the lower ends of each of the yokes 232 are stud shafts 240 provided with brackets 241 having a stop surface 242. (See Figs. 27 and 28.) Rotatably supported between the brackets 241 and eccentrically positioned relative to the axis of shafts 240 is a concave guard roller 243 and adjacent the same attached to the brackets 241 by means of screws 244 is a peeling knife 245 curved corresponding to the contour of the guard roller 243 and provided with a cutting edge 246. This whole cutting unit consisting of the guard roller 243, the peeling knife 245, the brackets 241 and shaft 240 is freely rotatable on the yoke 232 within the limits established by stops 247. These stops form portions of stop blocks 248 secured to the free ends of the yoke 232 adjacent the brackets 241 and positioned relative thereto in such a manner as to cause abutment between the stop surface 242 of each bracket with its cooperating stop 247 for limiting the movement of the cutting unit. Fig. 27 shows the cutting assembly in one, and Fig. 28 in another of its extreme positions which it may assume during peeling operation. At the beginning of the peeling operation, the cutting assembly will be in a position somewhat like that as shown in Fig. 27, while at the end of the peeling operation, the cutting unit assumes a position similar to that as illustrated in Fig. 28.

The shaft 227 of one of the peeling assemblies associated with the peeling and stemming devices as shown in Figs. 17, 19, and 20 is provided with an arm 249 secured thereto by a set screw 250 and including a hub portion 251 carrying a roller 252 rotatably mounted thereon. The shaft 227 is further provided with shoulders 253 and 254 adapted to be engaged by adjustment screws 255 and 256 respectively, mounted within the arm 249 as clearly shown in Fig. 19. Another adjustment screw 257 carried by the arm 249 engages a lug 258 of the turret frame 8. The free end of the arm 249 is further provided with an opening 259 through which a spring stud 260 pivotally supported by a stud 261 on the turret frame 8 extends. Interposed between the arm 249 and retaining nuts 265 on the threaded end 266 of the stud 260 is a coil spring 267.

The roller 252 engages the inner annular cam surface 268 of a cam 269 stationarily mounted upon the upper end of shaft 7. In a similar manner, an arm 270 is secured to the shaft 226 and its construction is the same as that of arm 249 previously referred to with the exception, however, that the hub portion 271 thereof, which carries a roller 274, is somewhat shorter than that of the hub portion 251 of arm 249, as will be clearly seen from Fig. 20, so that the roller 274 will be held in engagement with an outer annular cam surface 275 of the cam member 269 previously referred to. All portions of the shaft 226, the arm 270, and its cooperating parts which correspond to those associated with the arm 249 have been correspondingly numbered in the drawings.

It will therefore be seen that with the parts above described in a position as shown in Fig. 19, the pressure exerted by the springs 267 upon the arms 249 and 270 will hold the peeling assemblies in closed position. The amount of closing of the peeling assemblies can be properly regulated by manipulation of the adjusting screws 257 while their outward or maximum open position can be accurately determined by adjustment screws 255 and 256. Before operation of the adjustment screws 255 and 256 to effect this latter adjustment, it is necessary, however, to loosen the set screws 250 and to lock the same again after the adjustment is performed.

During the operation of the machine, i. e., when the main turret is rotating, the rollers 252 and 274 travel along their cooperating annular cam surfaces 268 and 275, which are provided with hill and valley portions to effect simultaneous opening or closing of cooperating peeling assemblies 228 and 229. The opening and closing of the peeling assemblies occurs in definite relation with respect to the movement of their associated stemming tube, transfer tube, and index tube for obtaining continuously progressing peeling operations upon each pear passing through the machine.

While each stemming tube advances from the feed turret toward the discharge turret, the same is reciprocated, i. e., successively shifted upwardly and downwardly relative to the peeling assemblies, together with its cooperating index tube and transfer tube, by the action of cams 148, 166, and rollers 145 and 164. When a pear is supported upon the stemming tube 196 while the same performs its upward movement, the peeling assemblies are held in open position but will immediately close below the fruit after the same has reached its uppermost position. Upon the following downward movement of the stemming tube, the pear enters stem-end first between the guard rollers 243, engaging the peeling knives 245, causing rotation of the cutting units in directions as indicated by arrows in Fig. 29 until the guard rollers 243 contact the fruit. This action positions the peeling knives relative to the fruit for peeling operation. While the pear passes downwardly through the peeling assemblies, the pressure exerted by the fruit against the peeling knives and the relative pressure between the guard rollers and the fruit acts against the tension of the springs 267 and causes sufficient spreading or opening of the peeling assemblies to permit passage of the fruit therethrough.

It will therefore be seen that the pressure force exerted by the fruit upon the peeling knives 245 during the peeling operation of each cutting unit forces its cooperating guard roller 243 into fruit contacting position for gauging the position of the peeling knife with respect to the fruit to produce a peel of even thickness. While the contour of the pear varies toward the butt end thereof, the direction of the pressure force exerted by the fruit against the peeling knife changes accordingly with a resultant change in the position of the guard roller 243, thereby automatically maintaining the peeling knife in proper peeling position irrespective of the contour of the fruit.

The provision of the stops 247 and the stop surface 242 of each of the brackets 241 performs a rather important function. With these parts in position as shown in Fig. 27, the roller 243 is swung downwardly by gravity into the position shown to position the knife for immediate peeling operation, so that upon contact of the fruit with the peeling knife 245 the same moves instantaneously into operative position and is held in properly gauged position relative to the pear by the guard rollers 243 when the peeling action commences. Fig. 29 illustrates the beginning of the peeling operation in a somewhat diagrammatic manner and shows the position of the peeling knives at such time. During the further downward movement of the pear the guard rollers 243 follow the contour of the same and automatically shift the peeling knives 245 and automatically maintain them always in proper cutting position for producing a peel of even thickness throughout the entire operation.

While the cutting units of the peeling assemblies approach the butt end of the pear, the direction of the pressure force exerted by the fruit against the peeling knives changes considerably, and the same move, therefore, gradually to a position as illustrated in Fig. 30, at which time the stop surfaces 242 of the brackets 241 abut against the stops 247 in a manner as shown in Fig. 28. This limits further relative movement of the peeling knives with respect to the fruit, and the peeling knives will gradually move out of engagement with the fruit leaving only a small unpeeled portion near the calyx end thereof.

During the first part of each peeling operation the transfer tube head 136 is held in a position as shown in Fig. 29 to offer sufficient support for the fruit to prevent displacement of the same in an upward direction. However, when the peeling knives travel around the butt end of the pear and the vertical upwardly directed cutting pressure of the knives changes to a substantially horizontal direction, this support is no longer needed, as the support offered by the end 195 of the index tube is now sufficient, and the transfer tube 135 and its head 136 therefore cease to move downwardly as shown in Fig. 30, so as to prevent any interference thereof with the peeling knives.

Upon completion of the peeling operation above described, the index wheel 189 is rotated due to the action of its cooperating cam 191 and the fruit is thereby rotated around its vertical axis so as to present a fresh skin portion thereof to the peeling assemblies to be removed during the next peeling operation. At the same time the peeling assemblies are opened by the action of the cams 268, 275, rollers 252 and 274, and the index tube 154, stemming tube 196, and the fruit impaled thereon are moved upwardly, whereupon the next peeling operation commences upon subsequent downward movement of the index tube 154 and stemming tube 196, after the peeling assemblies have closed again below the fruit in the same manner as previously described. Upon completion of this next peeling operation, a third and a fourth peeling operation are performed in exactly the same manner, at which time the fruit will be completely peeled and ready for further operations, as will be hereinafter described.

It has to be kept in mind that during the peeling operations of each stemming and peeling unit mounted on the main turret B, the latter rotates causing travelling of the various rollers of these units along the continuous camways of their cooperating cams. Likewise, the indexing wheel 189 travels within the camway of its cooperating cam 191. The index cam 191 is somewhat similar in configuration to the stemming tube cam 166. However, certain portions of the index cam which effect the indexing operation of the index wheel 189 are of entirely different construction, and will be therefore specifically described in the following, while the configuration of all of the other cams will be thoroughly discussed in reference to the complete operation of the machine.

From the description of the peeling operation of the peeling assemblies given hereinbefore, it will be noted that during the upward movement of the index tube 154 and stemming tube 196, after the first peeling operation, the index tube is rotated a certain amount to present a fresh skin portion of the pear to the peeling assemblies to be removed during the following peeling operation. Similar indexing operations are performed after the second and third peeling operation, and also after the fruit has been transferred to the discharge turret, at which time the index tube has rotated one-half revolution or 180 degrees.

For the purpose of simplicity, in the following only one indexing operation will be described, while in the final résumé of the entire operation of the machine the various indexing operations will be set forth in their proper relation with respect to the other operations of the machine.

Referring now to Figs. 3 and 23 to 26 inclusive, it will be seen that the index cam 191 comprises a plurality of indexing stations 280, at which the cam tracks 192 and 193 thereof ascend and are spaced farther apart relative to each other than along their descending sections 281. One of the ascending indexing stations 280 of the index cam 191 has been shown in detail in Fig. 23, and from this figure it will be noted that the lower cam track 193 is provided with a horizontal portion 282, a vertical portion 283, and a gradually ascending portion 284. The upper cam track 192 consists of an ascending portion 285 and a vertically descending portion 286.

During the rotation of the main turret B, while the indexing wheel moves in unison with the index tube, with one of its fingers within the cam way of the index cam 191, the finger 287 will enter the index cam section 280 at 288, and finger 289 will strike against the vertical portion 283 extending somewhat beyond the width of the lower cam track 193 in a manner as clearly shown in Fig. 24. Consequently, the index wheel 189 will be somewhat rotated and its finger 290 will disengage from the notch 203 of the curved latch 201, while the finger 289 enters the cam way of the index cam 191. Upon further upward movement of the index wheel 189 with its finger 289 bearing against the ascending cam portion 284, the index wheel 189 will be further rotated to a position approximately as shown in Fig. 25. This is due to the fact that during the upward movement of the index wheel 189 the same moves also horizontally relative to the ascending cam portion 284. At the uppermost position which the index wheel 189 will assume during its upward movement, the finger 287 thereof engages the vertically descending cam portion 286, while the finger 289 moves into the cam way portion 291 and will at such time be at an approximate position as shown in Fig. 26. Further horizontal movement of the index wheel 189 toward the discharge turret during the rotation of the main turret B will therefore cause additional rotation of the index wheel 189 until its finger 287 leaves the cam section 280 and disengages from the vertically descending portion 286. At this time the index wheel finger 289 will be entirely within the cam way 291 of the index cam 191, and the index wheel will have performed one-eighth of a complete revolution, and is now locked in this position by engagement of the finger 292 with the notch 203 of the latch 201 urged into locking position by means of spring 204. This completes one indexing cycle of the index wheel which remains locked in the position as shown in Fig. 26, until another indexing station of cam 191 is approached. As already stated hereinbefore, after each peeling operation performed upon a single fruit passing through the machine, an indexing action takes place with the exception that after the last peeling operation there is no indexing action until the fruit has been transferred to the discharge turret.

Upon completion of the last peeling operation above referred to, the index tube 154, stemming tube 196, and the fruit impaled upon the latter move upwardly, and during the subsequent downward movement of the stemming tube, positioning the same for transfer of the fruit to the discharge turret, the peeling assemblies remain open and the transfer tube 135 moves relative to the stemming tube 196 until the lower surface of the head 136 is in alignment with the lower end 198 of the stemming tube. The peeled fruit is thereby transferred from the stemming tube to one of the splitting blades (hereinafter to be more fully described) carried by the discharge turret C, which at this moment is properly positioned below the stemming tube. This acting partially impales the transferred fruit upon said splitting blade, which, during the rotation of the discharge turret C, presents the fruit to certain coring and trimming means which will be specifically described with reference to the discharge and coring turret.

It has been mentioned previously that the stemming tubes 196 are provided with fins 197 which prevent rotation of the fruits around the stemming tubes. These fins 197 are so positioned that at the time the transfer of the peeled fruit from the stemming tubes to the splitting blades of the discharge turret is effected, the fins are in alignment with the blades, so that the slight cuts in the fruit caused by the fins will ultimately be in the same plane in which the splitting blade cuts the fruit, so that the same will not be noticeable on the finished product.

During the first peeling operation, while the peeling knives approach the butt end of the fruit, roller 176 runs off the cam surface 177 and torsion spring 181 automatically swings the support 171 into operative position. The limit arm 186 (see Figs. 4 and 22) abuts against the spacing rod 131 and holds the fruit support in proper alignment relative to the stemming tube, as indicated by the dotted line position shown in Fig. 21. After positioning of the fruit support 171 in the manner above stated, the upper end 180 of the support rod 170 runs off the cam surface 179 and under the action of spring 181 the fruit support moves upwardly into fruit supporting position, engaging the stem end of the fruit in a gentle manner and holding the same firmly against displacement from the stemming tube during all the subsequent peeling operations.

Depending upon the size of the fruit the stemming tube 196 may or may not project through the opening 172 of the support 171 and any possible interference between these parts is therefore effectively prevented.

The support 171 remains in fruit supporting position until the last peeling action is completed, whereupon the upper end 180 of the supporting rod 170 re-engages the cam surface 179 and the support is shifted downwardly, when a small fruit is supported upon the stemming tube, and held in such position during the upward movement of the stemming tube after the last peeling operation, or in case a large fruit is impaled upon the stemming tube the support rod 170 engages the cam surface 179 and is held from rising with the stemming tube. In each instance, however, the fruit support is thereby shifted out of the way of the stemming tube and subsequently rotated into inoperative position by the action of the roller 176 re-engaging the cam surface 177.

*Discharge turret construction*

The discharge turret structure C, clearly shown in Figs. 4, 5, and 34, comprises a vertical stationary shaft 300 which is supported at its lower end within a socket 301 of a bracket 302 secured to the base 5 of the machine. The upper end of the shaft 300 is received within a socket 303 forming a part of a roller guide 304 attached to the turret housing 27. The roller guide 304 forms a part of the coring turret, which will be specifically described later on. A screw 305 in the socket 301 engaging the lower end of the shaft 300 is adapted to permit vertical adjustment of the latter, and set screws 306 function to retain the shaft 300 in adjusted position. Fixed to the stationary shaft 300 by means of a key 307 and set screw 308, and secured to the bracket 302 by a flange 309 is a roller guide 310 having a slot-way forming a guide track 311.

Interposed between the socket 301 and the roller guide 310 is a spider arm structure 312 rotatably supported upon the shaft 300 by a hub 313 including a drive gear 314 integral therewith. This spider arm structure 312 has a plurality of spider arms 315 radially extending from the hub portion 313 thereof. Pivotally secured to the spider arms 315 by means of pivot pins 316 are turret links 317 carrying pivot shafts 318 upon which drive rollers 319 and guide rollers 320 are rotatably mounted. Each of the pivot shafts 318 rotatably arranged within the turret links 317 carries a follower arm 321 and a splitting blade 322 fixed thereto. The guide roller 320 is so positioned as to travel within the guide track 311 and the follower arm 321 carries a follower roller 323 likewise extending into the guide track 311.

The splitting blades 322 are provided with inclined cutting edges 324, a cut out portion 325 of a configuration permitting the entrance of the stemming tubes 196 and coring devices of the coring turret, to be later described, into the blade structure. Each splitting blade 322 carries removable discharge troughs 326 of a construction as clearly shown in Fig. 35.

Attached to the roller guide 310 and extending through an opening 327 in the casing 30 is a discharge chute 328. The troughs 326 are adapted to receive the halves into which the fruits are divided upon completion of all peeling and coring operations and to deliver the same to the discharge chute 328 which discharges the finished product from the machine.

The roller guide 310, its track 311, cooperating guide rollers 320, and driver rollers 319 are so positioned relative to the main turret structure that upon rotation of the spider 15 the arms 20 thereof receive the drive rollers 319 successively within their recessed ends and shift the same in a direction indicated by an arrow in Fig. 5, causing counter-clockwise rotation of the discharge turret.

The positioning of each splitting blade in alignment with the fins of each stemming tube during the rotation of the discharge and main turret is effected by movement of the follower roller 323 and follower arm 321 relative to the guide roller 320 due to the configuration of the guide track 311.

The number of spider arms of the spider structure 15 corresponds to the number of stemming and peeling units carried by the main turret and therefore the discharge turret will be rotated at such a speed as to present upon approach of a stemming tube to transfer position a properly aligned splitting blade thereto upon which the fruit is transferred and partially impaled. Furthermore, the guide track 311 is curved at the portion 329 thereof to conform with the path of rotation of the stemming tubes so that during the transfer period of the fruit the cooperating stemming tubes and splitting blades move in superposed congruent paths for a sufficient length of time to permit the transfer of the fruit.

Upon downward movement of a stemming tube to position the same for transfer of the fruit supported thereby, the stemming tube enters the recess 325 of the splitting blade aligned therewith and the subsequent downward movement of the transfer tube 135, referred to hereinbefore, shifts the fruit from the stemming tube and partially impales the same upon the splitting blade. During this action the stemming tube projects into the recess 325 of the splitting blade structure and serves as a guide which prevents misalignment of the fruit during the transfer process.

Pivotally mounted on a bracket 330 of the roller guide 304 and above the guide track 311 by means of a pivot pin 330ᵃ is a butt peeling assembly comprising a yoke 331 provided with a hub portion 331ᵃ through which the pivot pin 330ᵃ extends. See Figs. 5 and 37. The hub portion 331ᵃ comprises an abutment 332 cooperating with a limit stop 333 on the bracket 330 to prevent downward movement of the butt peeling assembly below a predetermined position. A spring 334 interposed between the bracket 330 and an upstanding pin 334ᵃ on the hub 331ᵃ normally retains the butt peeling assembly in its lowermost position. Pivotally mounted within the yoke 331 is a butt trimming unit 335 which comprises a guard roller and peeling knife 336. This butt trimming unit is of the same construction as the cutting unit shown in Fig. 27, and operates between the stops 337 of the yoke 331 in exactly the same manner.

When a pear is partially impaled upon one of the splitting blades during the rotation of the discharge turret, the same is carried past the butt trimming unit (see Fig. 37) presenting the butt end of the fruit to the peeling knife thereof, which immediately functions to peel the same, i. e., remove this portion of the skin of the fruit which was not subjected to the peeling action of the peeling assemblies within the main turret. The pear is now completely peeled and during the continuous rotation of the discharge turret in a counter-clockwise direction, and while the guide and follower rollers travel through the portion 338 of the guide track, the splitting knives 322 thereof and the peeled fruits impaled thereon move successively into alignment with coring and calyx trimming means described later on.

Coring turret construction

The coring turret structure D (see Figs. 4, 5, 36, 39, and 40) which is arranged above and partially overlying the discharge turret, comprises a vertical turret shaft 340, which is rotatably mounted within bearings 341 and 342. The bearing 341 forms a part of the bracket 302 secured to the base 5 of the machine as previously described. The bearings 342 are mounted within an elongated hub portion 344 of the roller guide structure 304 attached to the turret housing 27 by means of a horizontal flange 345 and a vertical flange 346. The roller guide 304 is further provided with a curved guide track 347, a discharge tube cam 348, and a calyx tube cam 349. The discharge tube cam 348 consists of the cam tracks 350 defining a cam way 351 therebetween. In a similar manner the calyx tube cam comprises the cam tracks 352 defining a cam way 353 therebetween. Both of these cams are continuous track type cams forming an integral part with the roller guide structure 304.

The lower end of the vertical turret shaft 340 is reduced as shown at 354 and carries a driven gear 355 resting against a shoulder 356 of the shaft and intermeshing with the drive gear 314 of the discharge turret previously referred to. The shaft 340 carries further a flange 357 which is keyed thereto, as shown at 358, for rotation therewith. Lock screws 359 extending through arcuate slots 360 in the driven gear 355 are threadedly secured to the flange 357 as shown at 361 and permit attachment of the gear 355 to the flange 357 in fixed relationship with respect to the turret shaft 340. When the lock screws 359 are loosened, however, the gear 355 may be somewhat rotated with respect to the flange 357 to permit adjustment between these parts for purposes referred to later on. Interposed between the bracket 302 and gear 355 is a roller bearing 362 adapted to take the vertical thrust of the turret shaft 340 and the parts supported thereby.

Fixed to the vertical turret shaft 340 below the roller guide 304 is a coring turret spider 363 consisting of radially extending spider arms 364 integral with a hub 365 secured to shaft 340 for rotation therewith by means of a set screw 366 and a key 367. The outer portions of each one of the spider arms 364 carry pivot pins 368 (see Fig. 40) by means of which links 369 are pivotally attached to each of the spider arms. The links 369 are integral with a tubular bearing portion 370 in which the hub 371 of a follower arm 372 is rotatably positioned. Secured to the free end of the follower arm 372 by means of a stud 373 is a rotatable follower roller 374 extending into the guide track 347. The upper portion of the hub 371 of the follower arm 372 supports a rotatable guide roller 375 held in position by means of a retaining collar 376 threadedly secured to the upper end of the hub portion 371, while a lock screw 377 is provided to prevent unscrewing of the retaining collar 376 during the operation of the machine. Another retaining collar 378 secured to the lower end of the hub 371 by means of a lock screw 379 assists further in maintaining the follower arm in proper position. Each of the links 369 carries coring, calyx trimming, and discharge devices which are of identical construction, and therefore in the following, the description of only one of these devices will be given.

Slidably mounted within the follower arm hub portion 371 is a discharge tube 380 provided with a head 381. The lower portion of the discharge tube 380 and head 381 are slotted as shown at 382 and the upper end of the discharge tube is formed with a key way 383 into which a key 384 extends. The key 384 comprises a screw stud 385 which is welded thereto and extends through the hub portion 371 of the follower arm 372. A nut 386 on the threaded end of the screw stud 385 permits rigid attachment of the key to the hub 371.

The upper end of the discharge tube 380 is threaded as shown at 387 for the reception of an interiorly threaded roller support 388. This roller support is constructed in the form of a clamp and is securely retained upon the discharge tube by a clamping screw 389. The roller support 388 is further provided with a roller stud 390 carrying a roller 391 rotatably mounted thereon and positioned within the cam way 351 of the discharge tube cam 348.

Slidably mounted within the discharge tube 380 and extending considerably above the same is a calyx tube 392 which carries at its lower end a calyx trimming knife 393 secured thereto by brazing or in any other convenient manner. This calyx trimming knife extends in an angular direction toward the longitudinal axis of the calyx tube so that when the knife is rotated and entered into the calyx portion of the fruit the same will be effectively removed. The upper end of the calyx tube is threaded as shown at 394 and screwed thereto is a cap 395 extending somewhat above the calyx tube structure for purposes specifically referred to hereinafter.

The calyx tube 392 is further provided with a shoulder 396 which engages an annular bearing seat 397 and retains the same thereon in proper position. Interposed between the bearing seat 397 and a flange 398 on the cap 395 are roller bearings 399 held in properly spaced relationship with respect to each other by means of a tubular spacer sleeve 400. The entire bearing structure just referred to is enclosed by a housing 401, which carries a rotatable roller 402 by means of a stud 403 threadedly secured to said housing. The roller 402 extends into the cam way 353 of the calyx tube cam 349 previously referred to.

Vertically movable and rotatably mounted within the calyx tube 392 is a coring tube 404 extending with its upper end through the cap 395 to which it is threadedly connected, as clearly shown at 405. The lower portion of the coring tube 404 is formed into a reduced tubular section 406, the end of which is closed as shown at 407, and extends through a bore 408 in the lower end of the calyx tube adjacent to calyx knife 393. A certain portion adjacent the lower end of the reduced tubular section 406 is cut away as shown at 409.

Positioned within the coring tube 404 is a vertically movable coring knife actuating rod 415 having a reduced rectangular portion 416 which extends into the rectangular bore 417 of the reduced tubular portion 406 of the coring tube and is brazed to the upper end of a curved flexible coring knife 418. The lower end of the coring knife is received within the lower portion of the rectangular bore 417 at 419. A spring 420 interposed between the coring tube 404 and the coring knife actuating rod 415 normally retains the latter in its upper position, with the coring knife in retracted or inoperative position, as shown at the right in Fig. 36.

In view of the fact that the reduced portion of the actuating rod 415 and the bore 417 of the reduced portion 406 are of rectangular configuration in cross section, rotation between these parts is prevented and any undue torsion upon the coring knife is eliminated.

Upon vertical downward movement of the actuating rod 415 the coring knife 418 is flexed outwardly from its position shown at the right hand portion of Fig. 36 to its expanded or operative position as shown at the left hand portion of said figure. The downward movement of the coring knife actuating rod 415 is effected by a cam 421 which engages the upper end of the actuating rod at a certain stage during the rotation of the coring turret. The cam 421 extends vertically downward from the horizontal flange 345 of the roller guide 304 and is preferably formed integral therewith.

Secured to laterally extending lugs 422 of the roller support 388 are vertical guide rods 423 which extend through guide openings 424 of guide arms 425 on the housing 401. In this way the rollers 391 and 402 of the discharge tube 380 and calyx tube 392 are held in proper alignment relative to each other irrespective of rotation of the calyx tube with respect to the discharge tube.

Vertical and slidably secured to the cap 395 for rotation therewith by means of a key 426 is a pulley 427 provided with a conical groove 428 which is adapted to engage a double faced V-shaped drive belt 429, trained around a drive pulley 430 and an idler pulley 431, during a certain stage in the rotation of the coring turret D. The idler pulley 431 is freely rotatably suspended on a downwardly extending boss 432 of the horizontal flange 345 of the roller guide 304 by means of a stud bolt 433 threadedly secured to the boss 432. The drive pulley 430, however, is keyed to a shaft 434 of an electric motor or similar source of motive power 435. The motor 435, preferably of the vertical type, is mounted upon the roller guide flange 345 with its drive shaft extending through a bearing sleeve 436 forming also a part of the flange portion 345. The turret casing 30 is cut away as shown at 437 in Fig. 4 and the motor 435 extends therethrough to permit servicing of the same without removal of the casing 30.

Upon operation of the electric motor 435 the drive belt 429 is driven and upon engagement of the pulley 427 therewith, so that outer V-shaped portion of the belt enters the groove 428 and comes in frictional contact therewith, the same will be rotated together with the calyx tube 392 and coring tube 404.

From the foregoing description it will therefore be seen that upon continuous rotation of the discharge turret in a counter-clockwise direction, as viewed in Figs. 5 and 40, the coring turret will be continuously rotated in a clockwise direction in proper timed relation therewith. The correct position of the coring turret with respect to the discharge turret may be critically adjusted by changing the relative position between the gear 355 and flange 357 after loosening of the clamp screws 359 previously referred to.

After a splitting blade of the continuously rotating discharge turret with a fruit impaled thereon has passed the butt trimming knife 335 the cooperating guide roller 320 and follower roller 323 of the discharge turret enter the portion 338 of the guide track 311 and present the splitting blade and fruit in proper alignment relative to the coring turret.

At the time the guide roller 320 and follower roller 323 of a splitting blade 322 enter the guide track portion 338, the guide roller 375 and follower roller 374 of one set of the coring and calyx removing devices enter the guide track section 440 of the coring turret and due to the corresponding configurations of the guide track sections 338 and 440 of the discharge turret and coring turret respectively, these coring and calyx removing devices travel through section 440 in a path congruent with the path of the splitting blade which advances the fruit impaled thereon toward the discharge chute 328.

It will therefore be seen that with the parts above referred to entering the guide track sections 338 and 440 the relative position between the guide roller 320 and follower roller 323 and between the guide roller 375 and follower roller 374 places and maintains the splitting blade and the coring and calyx removing devices in such relation to each other that the slot 382 in the lower end of the discharge tube, which is keyed to the follower roller arm 372 for rotation therewith, is in alignment with the splitting blade, and the lower end 406 of the coring tube 404 is centered relative to the splitting blade and calyx end of the fruit for entrance into the opening of the latter caused by the stemming devices to position the coring knife for coring operation within the recess 325 of the splitting blade adjacent the seed cell of the fruit.

During the entrance of cooperating units of the discharge turret and coring turet into the guide track portions 338 and 440 as previously stated, the pulley 427 engages the drive belt 429, causing rapid rotation of the coring tube 380 and calyx tube 404, and the descending portions of cams 348 and 349 cause downward movement of the discharge tube 380 so that the head 381 thereof will engage the butt end of the fruit and force the latter an additional distance downward upon the splitting blade. Simultaneous therewith the rapidly rotating calyx tube 392 and coring tube 404 move downwardly effecting introduction of the reduced end 406 of the coring tube into the opening in the fruit and positioning of the coring knife 418 adjacent the seed cell thereof, while at the same time the calyx knife 393 enters the calyx end of the fruit and removes the calyx portion thereof.

As soon as the coring knife 418 is positioned adjacent the seed cell of the fruit, the upper end of the coring knife actuating rod 415 strikes against the cam 421 and is forced downwardly, thereby flexing the coring knife into expanded or operative position, and while the same rotates with the coring tube the coring operation is immediately performed upon the fruit during the expansion of the knife.

While the rotation of the discharge and coring turrets continues, the coring knife actuating rod 415 disengages from the cam 421, spring 420 retracts the coring knife, and the calyx tube and coring tube are thereupon moved upwardly out of engagement with the fruit, and the further descending cam 348 pushes the discharge tube over the splitting blade, which enters the slot 382 thereof, a sufficient distance to force the fruit entirely over the splitting blade, causing a complete splitting of the fruit into two halves, which slide into the inclined troughs 326 and finally into the discharge chute 328, which discharges the finished product from the machine.

The discharge tube is returned to its original position upon the completion of the splitting operation, and the operation of succeeding coring and splitting devices during the continuous rotation of discharge and coring turrets is exactly the same as above described.

The main turret, discharge turret, and coring turret may be preferably provided with water spray lines for cleaning and lubricating the fruit during fruit preparing operations. Certain of these spray means have been shown at 450 in Fig. 4 in connection with the main turret and in a similar way the discharge turret and coring turret may be equipped therewith as will be obvious to those in the art. The various spray lines are connected to a source of water supply in any desired manner.

Operation

Referring now to Figs. 31, 32, 33, and 41 of the drawings, a résumé of the complete operation of the entire machine will be given, wherein the function of all of its parts will be set forth in proper sequence and timed relation.

Fig. 31 represents a diagrammatic plan view of the machine and illustrates primarily the operative relationship of the various turrets. From this figure it will be noted that upon operation of the motor 13 the main turret B is rotated in a clockwise direction, which in turn by means of the arms 20 of its spider structure 15 successively engaging the drive rollers 75 and 319 of the respective spider members 45 and 312, rotates the feed turret A and the discharge turret C in counterclockwise directions as indicated by arrows in Fig. 31. Due to the cooperative connection of the discharge turret with the coring turret by means of intermeshing gears 314 and 355, the coring turret D is rotated in a clockwise direction.

With the above in mind, it will therefore be noted that the feed turret A and discharge turret C are rotated in timed relation with respect to the main turret, while in a similar manner the discharge turret C and the coring turret D are rotated in timed relation relative to each other at a ratio 1:1, due to the function of their cooperating gears 314 and 355.

All of the above mentioned turrets rotate, therefore, continuously during the operation of the machine, and in view of the fact that the predetermined rotative relationship between the same is fixed, the various centering, trimming, peeling, coring, and splitting devices are advanced, operated, and interrelated with respect to each other in a predetermined manner to accomplish the fruit preparing operations specifically described heretofore.

In describing the entire operation of the fruit preparation machine, the travel of a single fruit through the same from its entrance into the feed turret to its discharge as a finished product from the discharge turret will be followed. However, it is to be understood that while the machine is in operation the fruits are continuously supplied to the feed turret and travel successively past various stages in the rotation of the main turret and discharge turret, and at all of these stages separate fruit preparing operations are performed upon each single fruit within the machine.

It will therefore be seen that when the operator drops a fruit stem end first into the pocket 80 of a passing centering unit 35 the same advances the fruit toward the main turret and simultaneously aligns and centers the same for presentation thereof to such one of the stemming tubes as will travel in congruity therewith during the impaling action.

A specific description of the operation of the feed turret is believed to be superfluous, as the same has been fully treated in connection with the description of the feed turret mechanism. However, it may be generally mentioned that after the fruit has been received by its centering unit, and while such unit advances toward a stemming tube of the main turret, the centering fingers close toward the fruit and align the same in such a manner that the stem portion thereof will be in an accurate vertical position properly centered relative to the centering unit and the stemming tube cooperating with the same.

The aligned position of the centering unit and fruit with respect to a cooperating stemming tube 196 of the main turret B as above referred to is shown at the left hand side of Fig. 32.

Referring first to Fig. 32 in a general manner, it will be seen that the same illustrates in a schematic fashion the various cams of the main turret in their proper relation with respect to each other, and below certain portions of these cams there are diagrammatic illustrations of the stemming and peeling devices and their associated parts in various positions of operation which they will assume during the rotation of the main turret.

It is also to be noted that Fig. 33 is the continuation of Fig. 32 from the right hand side thereof.

All the cams shown in Figs. 32 and 33 have been laid out in a plane to simplify the illustration, and it is, of course, to be understood that these cams are actually parts of the cylindrical turret housing 27, as shown in Fig. 4. All of the parts illustrated in Figs. 32 and 33 correspond with the parts of the machine previously described, and have been designated by the same reference numerals, with the exception, however, of certain symbols 451 which do not represent parts of the machine and merely have been adopted in connection with the diagrams of Figs. 32 and 33 for the purpose of indicating the rotative postion of the index and stemming tubes.

Continuing now the description of the operation of the machine, it should be noted that when the fruit is properly aligned and centered within the centering unit 35 and said centering unit is in a position as shown at E in Fig. 32, the stemming tube 196 will be moved downwardly by the roller 164 of the index tube 154, to which the stemming tube 196 is secured, and will thereby enter the fruit in a manner as shown at F, performing the stemming operation and impaling the fruit upon the stemming tube. In other words, when the parts are in a position as shown at E, the roller 164 will travel downwardly the descending cam portion 454 of the stemming tube cam 166 until the roller 164 reaches its lowermost position at 455, which designates the end of the downward movement of the stemming tube. During this time in the rotation of the main turret the roller 145 travels along the horizontal transfer tube cam portion 453 and the transfer tube is maintained in its original position as shown at E. During the downward travel of the roller 164 until it reaches its position 455, the index wheel 189 travels downwardly therewith. However, in view of the fact that the index cam 191 descends at the same inclination as the cam 166, the rotative position of the index wheel 189 and the index tube 154 is not varied. It should also be noted that the roller 176 of the fruit support 171 is at this time in engagement with the cam surface 178 and likewise the upper end 180 of the support rod 170 is in engagement with the cam surface 179. Therefore, the fruit support 171 is held in inoperative position in a manner as already specifically described previously herein. Previous to the downward travel of roller 164 the core ejector 208 is in its lowermost position with the end 211 thereof substantially flush with the lower end 198 of the stemming tube 196.

The peeling assemblies 228 and 229 are in open position as shown at E, due to the engagement of rollers 252 and 274 thereof with the cams 268 and 275 respectively. The index tube 154 is in a certain position of its rotation as diagrammatically illustrated by the symbol 451 previously referred to. The diametrical line 457 indicates the rotative position of the stemming tube.

Therefore, while the stemming and peeling devices advance from the position as shown at E to the position illustrated at F, the only operations performed are the downward movement of the stemming tube 196 to perform the stemming and impaling operation, and the opening of the centering fingers of the centering unit 35 to release the fruit, which is now solely supported by the stemming tube 196, upon which it is impaled. During the stemming operation above mentioned, the stem portion of the fruit enters the stemming tube and forces the stem ejector upwardly a certain distance, corresponding to the length of the stem portion received within the stemming tube.

Somewhere between positions E and F the opening of the centering fingers of the centering unit 35 begins. However, this opening action of the fingers is so timed that the stemming tube will have entered the pear partially before the fingers begin to open. This, of course, is only true if the fruit is of small or medium size in diameter. If a large fruit is handled by the centering unit, the centering fingers may not open until the stemming tube has practically completely impaled the fruit. However, the centering fingers open, in such case, at least, previous to the following upward movement of the stemming tube, which will be treated hereafter, to permit the removal of the fruit from the centering unit without interference with the same.

After the roller 164 has reached the position 455 it travels upwardly during the further rotation of the main turret, due to the ascending cam portion 458 of the stemming tube cam 166, and consequently the stemming tube 196 will move upwardly and lift the fruit out of the pocket of the centering unit 35, while at the same time the paths of travel of said centering unit and stemming tube 196 divert.

During the above described stemming operation and transfer of the fruit from the centering unit 35 to the stemming tube 196, the follower roller 64 travels along the portion of the guide track 41 which is concentric to the axis of the main turret B and effects a slight rotation of the centering unit 35 with respect to the guide track 41 so as to maintain the centering unit 35 and the stemming tube 196 in proper rotative alignment with respect to each other.

While the stemming tube performs the operation last referred to, the index wheel 189 travels upwardly with one of its fingers projecting into the ascending cam portion 459 of the index cam 191, but obviously no indexing operation is performed. The transfer tube 135 moves likewise slightly upward, while its roller 145 travels along the ascending cam portion 460. However, the ascent of the cam portion 460 of the transfer tube cam 148 is less than that of the cam 166, as shown at 458, and therefore, while the stemming tube and transfer tube move upwardly, the latter moves, nevertheless, a slight distance downwardly relative to the stemming tube. As there is no change in the configuration of the cams 268 and 275, the peeling assemblies 228 and 229 remain open. Likewise, the fruit support 171 remains in the same inoperative position as previously referred to. The parts are now in a position as shown at G, with the fruit impaled upon the stemming tube. However, the stemming tube does not extend entirely through the fruit, so that during the continuing rotation of the main turret, while the roller 164 travels along the horizontal portion 462, the pear passes the rapidly rotating circular trimming blade 217, which is positioned directly within the path of the fruit, and the stem end thereof is cut off. The transfer tube cam 148 ascends further, and while the stem end trimming of the fruit is performed, the transfer tube 135 continues its upward movement until its head 136 is in alignment with the end 195 of the index tube, and upon reaching the sharply ascending portion 463 of the cam 166 the roller 164 causes a rapid upward movement of the stemming tube 196 and the fruit impaled thereon. The index cam 191 above the portions 462 and 463 is of a configuration similar to cam 166, so that the index wheel, which is supported on the index tube 154, can perform a similar motion. At the same time, the valley portions 464 and 465 of the cams 268 and 275 respectively permit downward movement of the rollers 252 and 274 under the influence of the springs 267, and the peeling assemblies will close below the stem end of the fruit. The following portions of the cams 191, 166, and 148 as indicated at 466, 467, and 468 descend at the same rate, and the index wheel 189 and the rollers 164 and 145 move downwardly in unison. Therefore, during this operation with the peelinig assemblies urged to closed position, the fruit supported on the stemming tube will be forced downwardly between the peeling assmblies, which will open sufficiently, due to the pressure of the fruit thereagainst, to permit the passage of the same, and simultaneously therewith the peeling knives 245 will be swung into operative or peeling position relative to the fruit, while the guard rollers of the peeling assemblies travel along the contour of the same, to perform the first peeling operation removing opposite strips of skin from the fruit.

The beginning of the peeling operation just referred to is shown at H, which further illustrates that when the peeling action commences the pear slides upwardly on the stemming tube until the butt end thereof contacts the head 136 of the transfer tube 135 and the end 195 of the index tube 154, due to the relative pressure between the peeling blades and the fruit during the peeling operation. The illustration of the parts as shown at I in Fig. 32 shows the peeling assemblies in the position which they will assume toward the end of the first peeling operation. When the peeling knives travel along the butt end of the fruit, the transfer tube does not follow entirely the downward travel of the index and stemming tube but is retained at a certain elevation as soon as the roller 145 enters a short horizontal portion 471 of the transfer tube cam 148. In other words, the index tube 154 moves somewhat relative to the transfer tube 135, so that the latter is held in a retracted position with respect to the end 195 of the index tube to permit movement of the peeling knives toward the calyx portion of the fruit without interference with the head 136.

Shortly before the commencement of the butt peeling operation as illustrated at I in Fig. 32, the roller 176 disengages from its cam surface 178, and due to the action of spring 181 the fruit support 171 will be rotated into operative position below the fruit, and the upper end 180 of the support rod 170 disengages from the cam surface 179 immediately after the fruit support 171 has been moved to operative position. When this happens, the spring 181 shifts the support rod 170 and fruit support 171 upwardly, so that the latter will engage the stem end of the fruit, as clearly shown at I, and hold the same in proper position on the stemming tube. It will be seen, therefore, that while the peeling knives perform the peeling operation around the butt end of the fruit, the pressure exerted by the knives cannot shift the fruit on the stemming tube in a downward direction, because the fruit support 171 prevents such undesirable movement of the fruit. During the greater part of the downward movement of the fruit during the peeling operation, the head 136 prevents upward movement of the fruit, which otherwise would be forced upon the index tube. However, during the peeling operation around the butt end of the fruit, the head 136 of the transfer tube 135 may be safely retracted because the end of the index tube as shown at 195 in Fig. 17 renders sufficient support against upward movement of the fruit. When the roller 164 of the index tube 154 reaches its lowermost position after the above described first peeling operation as indicated at 472, the hill portions 473 and 474 of the cams 268 and 275, respectively, engage their cooperating rollers 252 and 274 and shift the same upwardly to cause immediate spreading or opening of the peeling assemblies, so that while the roller 164 travels upwardly along the ascending cam portion 480 of the stemming tube cam 166, the fruit may now be lifted again above the peeling knives of the peeling assemblies 228 and 229 to position the fruit for the next peeling operation. At the same time, the transfer tube 135 moves upwardly, while its roller travels along the ascending portion 481 of the transfer tube cam 148. However, the ascent of this cam portion is somewhat less than the ascent of the cam portion 480 of the stemming tube cam, and therefore the index tube 154 will move relative to the transfer tube 135 so that when the rollers 164 and 145 reach their uppermost position at the end of the ascent of the cam portions 480 and 481 the transfer tube head 136 will again be in alignment with the end 195 of the index tube, or, in other words, the head 136 will again contact the butt end of the fruit and prevent upward movement of the latter relative to the stemming tube during the next or second peeling operation.

Incidental to the movement of the rollers 164 and 145 along the cam portions 480 and 481, the index wheel 189 passes its first indexing station 482, and the index tube 154, stemming tube 196, and fruit are rotated one-eighth of a revolution or 45 degrees, so that when the stemming tube reaches the next uppermost position previous to the commencement of the second peeling operation, the fruit is in such a position with respect to the peeling knives of the peeling assemblies 228 and 229 that upon their subsequent operation fresh portions of the skin thereof will be removed. After the first peeling operation and before the parts above referred to are conditioned for the next peeling operation, the ejector head 209 of the stem ejector 208 will engage the cam surface 214 and while the stemming tube 196 moves upwardly as hereinbefore mentioned, previous to the commencement of the second peeling operation, the stem ejector is prevented from upward movement and will therefore cause ejection of the stem portion of the fruit, which entered the tubular space of the stemming tube during the stemming operation. The position of the parts as diagrammatically shown at J illustrates the upward movement of the index tube, stemming tube, and transfer tube during the conditioning of these devices for the second peeling operation.

After all of the devices above referred to have been conditioned for the second peeling operation, the rollers 164 and 145 move downwardly during their travel along the following descending cam portions 484 and 485, and the next peeling operation takes place. At the end of the downward stroke during the second peeling operation the head 136 of the transfer tube 135 is again held in a retracted position, so as to permit the peeling of the butt end portion of the fruit in exactly the same manner as previously referred to herein in connection with the first peeling operation. Shortly before the rollers 164 and 145 move downward along their respective cam portions 484 and 485, the rollers 252 and 274 of the peeling assemblies disengage from the hill portions 473 and 474 of their respective cams 268 and 275 and due to the action of the springs 267 the peeling assemblies are closed below the stem end of the fruit.

At the end of the second peeling operation the rollers of the peeling assemblies just referred to engage the hill portions 486 and 487 of their cooperating cams and are immediately opened. Upon commencement of the second peeling operation, the ejector head 209 moves out of engagement with the cam surface 214, as will be clearly seen from Fig. 32, and during the remainder of this cycle of operation of the machine, the ejector remains in its lowermost position until, at the beginning of a new cycle, it is again shifted upwardly by the stem portion of the next fruit received within the stemming tube.

The position of the parts as shown at K in Fig. 32 illustrates diagrammatically the second peeling operation, while at L their conditioning for the third peeling operation is disclosed.

While the rotation of the main turret continues, the rollers 164 and 145 now enter the ascending cam portions 489 and 490. The index tube, stemming tube, fruit, and transfer tube move upwardly to condition the fruit for the third peeling operation. Again a relative movement between the transfer tube and the index tube takes place to align the head 136 of the transfer tube with the lower end 195 of the index tube 154. At the same time, the index wheel 189, which moves in unison with the index tube 154, enters the indexing station 495 of the index cam 191 and another one-eighth revolution of the index tube 154 and stemming tube 196 is accomplished to present fresh portions of the skin of the fruit to the peeling assemblies, to be removed thereby during the third peeling operation. When all of the parts referred to are conditioned for the third peeling stroke, the rollers 252 and 274 of the peeling assemblies disengage from the hill portions 486 and 487 of their respective cams, and the peeling assemblies are moved by the springs 267 immediately to closed position, and upon the following downward movement of the stemming tube and transfer tube while their rollers travel along their respective descending cam portions 496 and 497, the third peeling operation is performed, at the end of which the transfer tube 135 is again held in a retracted position relative to the lower end of the index tube, so that the peeling operation around the butt end of the fruit may be performed without interference between the peeling knives and the transfer tube in substantially the same manner as previously referred to. At M the peeling assemblies, index, stemming, and transfer tubes, as well as the fruit, are shown at a position which they assume during the third peeling operation. At the end of the third peeling operation the peeling assemblies are again opened due to the action of the hill portions 500 and 501 of cams 268 and 275 cooperating with the peeling assembly rollers 252 and 274, and the rollers 164 and 145 travel at such time upwardly along their cooperating ascending cam portions 502 and 503. At the same time, the index wheel 189 passes the index station 504 and another one-eighth revolution of the index and stemming tubes is performed.

This presents the last fresh skin portions of the fruit to the peeling knives to be removed during the fourth peeling operation, which is performed and accomplished in exactly the same manner as the peeling operations previously referred to. In other words, when the rollers 252 and 274 disengage from the hill portions 500 and 501 of the cams 268 and 275, the peeling assemblies close below the stem end of the fruit, which is forced downwardly through the peeling assemblies past the peeling knives upon downward travel of the rollers 164 and 145 along their cooperating descending cam portions 505 and 506. At the end of the last peeling operation above referred to, the peeling assemblies will open upon contact of their rollers 252 and 274 with the next hill portions 507 and 508 of their respective cams and remain open during the rest of the cycle described herein. The transfer tube is again held retracted with respect to the index tube 154 when its cooperating roller 145 enters the horizontal portion 509 of the cam 148.

After the completion of the last peeling operation, the upper end 180 of the support rod 170 engages the cam surface 179 and is shifted downwardly so as to move the pear support 171 out of contact with the stem end of the fruit. Shortly thereafter the roller 176 engages the cam surface 178 and the resultant rotation of the support rod 170 moves the fruit support 171 away from the stemming tube 196 into inoperative position. The rollers 164 and 145 enter now the ascending portions 510 and 511 of their respective cams and the index tube, stemming tube, and the transfer tube are moved upwardly a sufficient amount so as to position the stemming tube and the fruit impaled thereon above one of the splitting blades 322 of the discharge turret C, which they now approach, and with which they align at the moment the rollers 164 and 145 reach their position as shown at 512 and 513, respectively. The fins 197 of the stemming tube 196 previously referred to in the description of the main turret are at this time in such a position that they extend in the plane of the splitting blade 322. In other words, the position of the stemming tube 196 at the beginning of the cycle of operation described herein is such that after the third indexing operation is performed the fins 197 are in alignment with the splitting blade 322.

While the rotation of the main turret B continues and during the rotation of the discharge turret C with one of its splitting blades 322 in alignment with the stemming tube 196, the roller 164, index tube 154, and stemming tube 196 are forced downwardly due to the descending portion 514 of the stemming tube cam 166, and the lower end of the stemming tube 196 enters the recess 325 of the splitting blade 322. At the same time, the roller 145, travelling along the descending cam portion 515 of the transfer tube cam 148, causes downward movement of the transfer tube 135. It will therefore be seen that with the stemming tube 196 extending into the recess 325, the fruit is shifted downwardly upon downward movement of the transfer tube and is thereby transferred and partially impaled upon the splitting blade 322. After the roller 164 has passed the portion 516 of the stemming tube cam 166, it travels upwardly along the ascending cam portion 517 until it reaches its original elevation as shown at the extreme left hand side of Fig. 32.

During the first part of the upward movement of the stemming tube 196 last referred to, the transfer tube 135 continues its downward movement to completely transfer the fruit upon the splitting blade 322, and thereupon, while the roller 145 travels along the ascending cam portion 518 of the transfer tube cam 148, the transfer tube is elevated to its original position. At the time these operations take place, the index wheel 189 passes the last or fourth index station 519, and a final indexing operation of the index and stemming tube is accomplished. This final indexing operation is only necessary to position the fins 197 of the stemming tube 196 again in such a manner that upon completion of the peeling operations of the next cycle, the fins 197 are again in alignment with the next splitting blade 322 to which the following fruit is transferred. At N the index tube, stemming tube, fruit, transfer tube, and the peeling assemblies are shown in their position conditioned for the transfer of the fruit to one of the splitting blades 322 of the discharge turret C. At P, the same devices are shown at their positions which they assume during the transfer operation of the fruit, and at R the parts are shown in their respective positions which they will assume at the end of the transfer operation of the fruit to the splitting blades. This completes the entire cycle of the main turret.

In view of the fact that the operation of the main turret B is continuous, the right hand end portion of the diagram of Fig. 33 corresponds with the left hand end portion of Fig. 32.

After the transfer of the fruit to one of the splitting blades 322 during the continuous rotation of the discharge turret, the same is now presented to butt peeling, calyx removing, and coring devices and is finally split in two halves and discharged from the machine.

Referring now to this portion of the cycle of operation of the machine, which has been diagrammatically illustrated in Fig. 41, it will be noted that the fruit impaled upon the blade 322, as shown at the left hand side of Fig. 41, will advance toward the butt trimming knife 336, during the rotation of the discharge turret, and in passing the same the skin portion of the fruit around the calyx end thereof will now be removed. In view of the fact that the transfer tube 135 of the main turret previously referred to assumes a predetermined lowermost position during the transfer of the fruit upon the splitting blade referred to, the calyx end of the fruit will be always in a predetermined position with respect to the butt end trimming knife 336, irrespective of the size of the fruit.

During the continuing rotation of the discharge turret C, the completely peeled fruit is now presented to coring and calyx removing devices supported by the continuously rotating coring turret D. Within a certain stage in the rotation of the discharge turret and coring turret, the cooperating parts of these turrets travel in congruent paths in a manner as previously mentioned and therefore subsequent to the butt trimming operation of the fruit, as shown at S in Fig. 41 the coring tube 404, calyx tube 392, and the discharge tube 380 come into proper alignment with respect to the splitting blade 322 and the calyx end of the fruit. The rollers 391 and 402 of the discharge tube 380 and calyx tube 392 travel during the rotation of the coring turret along their cooperating cams 348 and 349 respectively, the roller 391 enters the slightly descending portion 528 of the discharge tube cam 348, and the discharge tube 380 is thereby moved downwardly, so that its head 381 engages the calyx end of the fruit and pushes the same a slight distance downwardly to reposition the fruit upon the splitting blade 322. The discharge tube remains now in this position with the head 381 in contact with the calyx end of the fruit. At the same time, the roller 402 travels downwardly the descending portion 529 of its corresponding calyx tube cam 349, and the calyx tube 392 and the coring tube 404 move correspondingly downward, so that the lower end of the coring tube 404 enters into the opening of the fruit produced by the stemming tube of the main turret. At this time the parts referred to are in a position as shown at T in Fig. 41.

The roller 402 travels now along the horizontal section 531 of the cam 349 and the downward movement of the calyx tube and coring tube ceases momentarily until the roller 402 reaches the descending portion 532 of its cooperating cam. However, before the roller enters into this cam section, as illustrated at U, the pulley 427 supported upon the calyx tube by means of a cap 395 engages the continuously operating drive belt 429, which enters the V-shaped groove 428 of the pulley, causing rapid rotation of the same and the calyx and coring tubes. While the roller 402 of the calyx tube 392 travels downwardly the descending portion 532 of the cam 349, the coring tube enters an additional distance into the opening of the fruit until the coring knife 418 is opposite the seed cell thereof, and the parts referred to have now assumed a position as shown at V. Simultaneous with such additional downward movement of the coring tube 404 and calyx tube 392, the rapidly rotating calyx knife 393 enters the fruit and the calyx thereof is removed.

The roller 402 travels thereupon along the horizontal cam section 535, and the upper end of the coring knife actuating rod 415 engages the cam 421, the resulting downward movement of the coring knife actuating rod causes expansion of the coring knife 418 to operative position as shown at W. In view of the fact that the coring tube is rapidly rotating, the coring knife 418 will cut the seed cell from the fruit and immediately upon completion of this coring operation, while the roller 402 continues its travel along the horizontal cam portion 535, the upper end of the coring knife actuating rod 415 will disengage from the cam 421 and spring 420 will return the coring knife 418 to inoperative or retracted position, as clearly shown at X in Fig. 41.

During the following stage in the rotation of the discharge turret C and coring turret D, the roller 402 travels upwardly the ascending cam portion 439 while the roller 391 of the discharge tube 380 travels downwardly along the descending cam portion 540 of the discharge tube cam 348. It will, therefore, be seen that while the calyx tube 392 and coring tube 404 are lifted upwardly, the transfer tube 380 moves downwardly and forces the fruit entirely over the splitting blade as shown at Y, splitting the fruit into two halves, which drop into the troughs 326 supported by the splitting blade 322 and finally the finished product slides from the said troughs over the discharge chute 328 out of the machine. The rollers 402 and 391 travel at the same time upwardly along the ascending cam portions 542 and 543 respectively, and move the calyx tube, coring tube, and discharge tube back to their original positions which they assume as soon as their cooperating rollers enter the horizontal cam portions 544 and 545. While this operation takes place, the paths of travel of the discharge turret and coring turret divert, the pulley 427 disengages from the drive belt 429, and the rotation of the calyx tube 392 and coring tube 404 ceases.

This completes the entire cycle of operation of the fruit preparation machine which, of course, repeats with respect to each fruit entering the machine.

While I have described a particular embodiment of the present invention, it will be obvious that various changes and modifications may be made in the details of the apparatus shown herein, without department from the spirit of the present invention and the scope of the appended claims.

Having now described my invention and in what manner the same may be used, what I claim as new and desire to protect by Letters Patent is:

1. A fruit preparation machine comprising a main turret, fruit holding and peeling means on said main turret, a discharge turret associated with said main turret, fruit splitting means on the discharge turret for receiving fruits from the holding means, a coring turret associated with the discharge turret, coring means on the coring turret for operation on fruits supported on the splitting means, means for rotating said turrets in timed relation, and means for guiding the splitting means in a path partly congruent with the paths of the holding and coring means.

2. In a fruit preparation machine, in combination, a peeling turret, fruit holding and peeling means on said turret, a discharge turret associated with said peeling turret, a coring turret associated with the discharge turret, coring means on the coring turret, means on the discharge turret for receiving fruits from the holding means of the peeling turret for presentation thereof to the coring means for coring operation, means for positioning the discharge turret in partly underlying relation with respect to the peeling turret and coring turret, and means for operating said turrets in timed relation.

3. In a feeding device for fruit preparation machines, a rotatable spider structure comprising a plurality of spider arms, fruit centering means on said arms, each of said centering means including a cluster bowl pivotally secured to the spider structure, a feed cluster rotatably mounted within the cluster bowl and having a pocket for receiving the stem end of a fruit, a plurality of centering fingers supported by the feed cluster and movable to fruit aligning position, cam means on the cluster bowl, actuating means on the centering fingers cooperating with the cam means for operating said fingers upon movement of the feed cluster with respect to the cluster bowl, a guide roller on the feed cluster, a drive roller on the feed cluster, a follower arm fixed with respect to the feed cluster, a follower roller on said follower arm, guide means for guiding the guide roller and follower roller for causing relative movement therebetween upon rotation of the spider structure and for causing relative movement between the feed cluster and cluster bowl to thereby effect operation of the centering fingers, and means engageable with the drive roller for rotating the spider structure.

4. In a fruit centering device for fruit preparation machines, fruit supporting means including an upwardly faced pocket having a conical surface for receiving the stem end of a fruit, a plurality of generally upright centering fingers pivotally secured at their lower ends to the supporting means adjacent the upper rim of said pocket and extending therefrom in outwardly inclined directions substantially in alignment with the conical surface of said pocket, and actuating means for causing pivotal movement of the centering fingers toward a fruit inserted into said pocket and into substantial vertical position for engaging said fruit and for shifting the same into centered position relative to said supporting means.

5. In a fruit centering device for fruit preparation machines, fruit supporting means including a pocket having a conical fruit receiving surface, a plurality of centering fingers pivotally secured to the supporting means adjacent said pockets and extending in outwardly inclined directions substantially in alignment with the conical surface of said pocket and forming a conical fruit receiving structure therewith, rotatable fruit engaging rollers on said centering fingers, and actuating means associated with each one of the centering fingers for causing individual pivotal movement of the same toward a fruit inserted stem end first into the conical fruit receiving structure for aligning the stem axis of said fruit relative to said fruit supporting structure irrespective of the configuration of said fruit.

6. In a fruit centering device for fruit preparation machines, fruit supporting means, a plurality of centering fingers pivotally secured to the fruit supporting means, resilient means associated with each one of said fingers for individually urging the same toward fruit aligning positions, means associated with adjacent centering fingers for permitting movement of one of adjacent fingers in advance of the other and for preventing such movement of the other of such fingers with respect to said first mentioned finger, an actuating arm on one of adjacent fingers, and control means engaging the actuating arm, said control means being movable in one direction for controlling the action of said resilient means and movable in another direction for moving said centering fingers to inoperative position.

7. A feeding device for fruit preparation machines comprising, in combination, a rotatable structure including a plurality of radially extending arms, fruit supporting and centering means on said arms and movable relative thereto including a feed cluster bowl and a rotatable feed cluster within said bowl, a stationary cam track associated with said rotatable structure, a guide roller and a drive roller on said feed cluster and extending into said cam track, a follower arm fixed to said feed cluster, a follower roller on said follower arm and extending into the cam track, fruit centering fingers on the feed cluster, means for actuating said fingers upon rotative movement between said feed cluster and cluster bowl and relative movement between said guide roller and follower roller during the rotation of the rotatable structure and the travel of the guide roller and follower roller along said cam track, and means engageable with the drive roller for rotating the rotatable structure.

8. In a fruit preparation machine, a rotatable turret, fruit impaling means on said turret and reciprocable with respect thereto, peeling means associated with the fruit impaling means, means for operating said impaling and peeling means upon rotation of said turret, fruit supporting means cooperating with the reciprocable impaling means for engaging the stem end of a fruit impaled upon the impaling means for retaining the same thereon, said means including a fruit engaging element movable laterally of the axis of the impaling means between fruit supporting and out of the way positions, and means for inter connecting the fruit supporting means with said impaling means for reciprocation therewith.

9. In a fruit preparation machine, in combination, a turret, reciprocable fruit impaling means on the turret, peeling means associated with the fruit impaling means, means for rotating said turret, means for operating the impaling and peeling means upon rotation of the turret, fruit supporting means for engaging the stem end of a fruit impaled upon said impaling means, said means including a fruit engaging element movable laterally of the axis of the impaling means between fruit supporting and out of the way positions, and means for moving said fruit supporting means to operative and inoperative position with respect to the impaling means, including resilient means for interconnecting the fruit supporting means with said impaling means for reciprocation therewith.

10. A fruit preparation machine, comprising, in combination, a turret, means for rotating the turret, vertically reciprocable transfer means on the turret, vertically reciprocable and intermittently rotatable impaling means associated with the transfer means, means for operating the impaling means and transfer means upon rotation of the turret, fruit retaining means horizontally movable relative to the impaling means, means for moving said fruit retaining means to inoperative position, means for automatically returning the retaining means to operative position relative to the impaling means and for interconnecting the retaining means with said impaling means for reciprocation therewith, peeling means associated with the impaling means, and means for operating the peeling means in timed relation relative to the impaling means upon rotation of the turret.

11. A fruit preparation machine comprising a feed turret, a discharge turret, a peeling turret intermediate said turrets, fruit trimming devices adjacent the peeling turret, vertically reciprocable holding means on the peeling turret for impaling fruits presented thereto by the feed turret and for moving the same past the trimming devices for removal of the stem end thereof, peeling means associated with the holding means for performing peeling operations upon fruits impaled upon the holding means, fruit transfer means associated with the holding means for transferring the fruits from the peeling turret to the discharge turret, and means for operating said turrets in timed relation.

12. A fruit preparation machine comprising a feed turret, a discharge turret, a peeling turret intermediate said turrets, fruit trimming devices adjacent the peeling turret, vertically reciprocable holding means on the peeling turret for impaling fruits presented thereto by the feed turret and for moving the same past the trimming devices for removal of the stem end thereof, fruit supporting means movable to operative position relative to the holding means subsequent to the removal of the stem end of the fruits for retaining the latter on the holding means, peeling means associated with the holding means for performing peeling operations upon fruits impaled upon the holding means, fruit transfer means associated with the holding means for transferring the fruits from the peeling turret to the discharge turret, and means for operating said turrets in timed relation.

13. A fruit preparation machine comprising, in combination, a rotatable main turret, fruit holding means on said turret, peeling means associated with the fruit holding means, a rotatable discharge turret cooperating with the main turret, splitting devices on the discharge turret for receiving fruits from the holding devices, butt peeling means adjacent said discharge turret for operation upon fruits presented thereto by the splitting devices upon rotation of the discharge turret, and means for operating said turrets in timed relation.

14. In a fruit preparation machine, a rotatable discharge turret, a rotatable coring turret, coring means on the coring turret, splitting devices on said discharge turret for supporting fruits impaled thereon and for presenting the same to the coring means for coring operation, butt peeling means stationarily positioned adjacent the discharge turret and automatically operable for peeling operation upon contact with the butt end of said fruits during their travel toward said coring means, and means for rotating said turrets in timed relation.

15. In a fruit preparation machine, in combination, a turret, a base structure including a receiving basin having a discharge opening, means for rotatably supporting the turret on the base structure, fruit holding and peeling means on the turret and above said basin, means for operating said fruit holding and peeling means upon rotation of said turret, and rotatable means extending into the receiving basin for removing peelings therefrom and for discharging the same through said discharge opening.

16. In a fruit preparation machine, in combination, a rotatable turret structure, a base including a receiving basin provided with a discharge opening, means for rotatably supporting the turret structure on the base, fruit holding and peeling means on the turret structure and above said receiving basin, means for operating said fruit holding and peeling means incident to rotation of the turret structure, and means secured to said turret structure and extending into said receiving basin for discharging peelings therefrom upon rotation of said turret structure.

17. In a fruit preparation machine, a rotatable discharge turret, a rotatable coring turret, coring means on the coring turret including a tube and an expansible coring knife on said tube, a splitting blade having a recess on said discharge turret for supporting fruit partially impaled thereon with the seed cell thereof adjacent said recess, means for moving said blade and coring means in partly congruent paths upon rotation of said turrets for presenting fruit impaled upon the splitting blade to said coring means, means for projecting said tube into said fruit and recess in said blade with the coring knife adjacent the seed cell of said fruit, means for expanding said knife, and means for rotating said knife in expanded position within the recess of said blade for removing the seed cell of said fruit.

18. In a fruit preparation machine, a discharge turret, a coring turret, coring means on the coring turret including a tube and an expansible coring knife on said tube, a splitting blade on the discharge turret having a recess for supporting fruit impaled thereon with the seed cell thereof adjacent said recess, calyx removing means adjacent said coring means and movable relative thereto, means for guiding said blade, coring means and calyx removing means in partly congruent paths upon rotation of said turrets for presenting fruit impaled upon the splitting blades to said coring and calyx removing means, means for engaging the calyx removing means with the calyx end of the fruit, means for rotating said calyx removing means for removing the calyx portion of the fruit, means for introducing the tube and knife into said fruit and recess in the splitting blade, means for expanding the knife, means for rotating said knife in expanded position within the recess of said blade for removing the seed cell of the fruit, means associated with the coring means and movable with respect to said splitting blade for completely impaling the fruit thereon for causing splitting of the same, and means for rotating said turrets in timed relation.

19. In a fruit preparation machine the combination of a feed turret, a main turret having fruit holding and peeling means, fruit centering means on said feed turret for receiving and centering fruit, means for operating said feed turret and said centering means for presenting the fruit to the holding means of the main turret, means for operating said holding means for impaling the fruit presented thereto and for successively moving the fruit past said peeling means for peeling the same, a discharge turret cooperating with the main turret, fruit splitting means on the discharge turret for receiving the peeled fruit from the holding means, means for operating the main turret and the discharge turret for presenting the holding means to the splitting means, and means for transferring the fruit impaled upon the holding means to said splitting means.

20. In a fruit centering device for fruit preparation machines, fruit supporting means having an upwardly faced pocket, a plurality of centering fingers pivotally secured to the fruit supporting means adjacent the upper rim of said pocket and extending therefrom in outwardly inclined directions forming a continuation of said pocket for guiding the stem end of fruit thereinto, and means for actuating said centering fingers for causing inward swinging movement of the same upwardly and inwardly toward a fruit positioned with its stem end in said pocket for aligning the same with respect to said pocket.

21. In a fruit centering device for fruit preparation machines, fruit supporting means including a pocket, a plurality of centering fingers pivotally secured at their lower ends to the fruit supporting means adjacent said pocket and extending outwardly therefrom in inclined directions forming a continuation of said pocket for guiding the stem end of a fruit delivered thereto into said pocket, each of said centering fingers being provided with a rotatable fruit engaging member, and means for actuating said centering fingers for causing inward movement of the same for righting and centering a fruit positioned therebetween, whereby the fruit engaging member of each finger is free to rotate upon contact with the fruit during lateral movement of the same into centered position.

22. A fruit splitting and coring device for fruit preparation machines comprising splitting means, means for partially impaling a fruit on said splitting means, coring means, means for moving said splitting means into and out of registration with the coring means, means for actuating said coring means upon registration thereof with the splitting means for performing coring operations upon a fruit partially impaled upon the latter, and means for completely impaling the fruit subsequent to the coring operation for splitting the same.

23. A coring device for fruit preparation machines comprising a coring tube, a calyx tube disposed concentric with the coring tube for rotation therewith, an expansible coring knife associated with the coring tube, calyx removing means on the calyx tube, means for simultaneously rotating said tubes, means common to said tubes for moving the same into operative position relative to a fruit presented thereto and means for expanding the coring knife subsequent to movement of said tubes to operative position.

24. A coring device for fruit preparation machines, comprising, in combination, a coring tube, coring means on said tube, a calyx tube disposed concentric with the coring tube for rotation therewith, calyx removing means on the calyx tube, means for rotating said coring and calyx tube, means for moving said tubes and coring and calyx removing means into operative position with respect to a fruit presented thereto, a discharge tube associated with the coring and calyx tube, and means for moving the discharge tube relative to the coring tube and calyx tube for shifting the fruit out of operative relation with said coring and calyx tube.

25. In a feeding device for fruit preparation machines, a rotatable turret structure, fruit centering units on said turret structure including a plurality of centering fingers positioned to form a conical fruit receiving pocket, and means associated with said turret structure for moving the centering fingers into substantially parallel positions with respect to each other upon movement of the turret structure relative to said means.

26. A coring device for fruit preparation machines comprising a coring tube, a calyx tube associated with the coring tube for rotation therewith, an expansible coring knife on the coring tube, calyx removing means on the calyx tube, means for simultaneously rotating said tubes, means common to said tubes for moving the same into operative position, and means for expanding the coring knife subsequent to movement of the coring tube to operative position.

27. A fruit preparation machine comprising in combination a continuously moving feed means, a continuously rotating peeling main turret, fruit impaling means on the main turret, fruit centering and holding means on the feed means, means for guiding the centering and holding means of the feed turret in a path having an arcuate portion extending about the axis of the main turret for a substantial distance, said portion being alined with the path of the impaling means, means for continuously rotating the main turret and the feed means in timed relation to cause the centering and holding means to be alined axially with the impaling means and to travel through the arcuate portion of the path in alinement with the impaling means, and means to operate the impaling means to impale the fruit during said alined travel.

28. A fruit handling machine comprising co-operating rotatable members, a reciprocable fruit impaling device carried by one of said members, an expansible fruit holder carried by the other of said members, means for continuously rotating said rotatable members in timed relation, means cooperating with the fruit holder for moving the same into and out of axial alignment with the impaling device and for maintaining the fruit holder in axial alignment with the impaling device for a finite distance, means for reciprocating said impaling device during such alignment to impale and remove fruit from said holder, means for holding the fruit holder closed during the impaling movement of said impaling device whereby the fruit is supported in said fruit holder until impaled, and means for opening the fruit holder to release the fruit as the impaling device is retracted.

29. A coring device for fruit preparation machines, comprising, in combination, a coring tube, a flexible coring knife carried by said tube, a calyx tube disposed concentric with the coring tube for rotation therewith, calyx removing means on the calyx tube, a discharge tube associated with the coring tube and calyx tube, means for rotating said coring tube and calyx tube, means for moving the coring tube and calyx tube into operative position relative to a fruit presented thereto for removing the calyx thereof and for positioning the coring knife adjacent the seed cell of said fruit, means for expanding and retracting the coring knife relative to the coring tube for performing coring operations upon the fruit, and means for moving said discharge tube relative to said coring tube and calyx tube for shifting the fruit out of engagement with said coring tube.

30. In a fruit processing machine, a turret, means for rotating the turret, a fruit impaling tube rotatably carried by the turret, peeling knives carried by the turret, means for feeding fruit to the turret for axial impalement by the impaling tubes, a fruit abutment movably disposed on each impaling tube, means for conjointly and recurrently reciprocating each of said impaling tubes and said abutment to cause the fruit to be peeled by said knives, means for rotating the impaling tube about its longitudinal axis during such reciprocation, and means for effecting relative longitudinal movement between the abutment and said tube after a peeling operation to remove the tube from the fruit.

ALBERT R. THOMPSON.

REFERENCES CITED

The following references are of record in the file of this patent:

UNITED STATES PATENTS

| Number | Name | Date |
|---|---|---|
| 44,044 | Howlan | Aug. 30, 1864 |
| 1,071,333 | Pease | Aug. 26, 1913 |
| 1,071,334 | Pease | Aug. 26, 1913 |
| 1,430,628 | Coon | Oct. 3, 1922 |
| 1,445,145 | Kohler | Feb. 13, 1923 |
| 1,451,571 | Gay | Apr. 10, 1923 |
| 1,467,616 | Forry | Sept. 11, 1923 |
| 1,654,091 | Pieler | Dec. 27, 1927 |
| 1,745,158 | Fish | Jan. 28, 1930 |
| 1,820,351 | Duncan | Aug. 25, 1931 |
| 1,827,869 | Casey | Oct. 20, 1931 |
| 1,834,097 | Gurn | Dec. 1, 1931 |
| 1,837,335 | Reinstein et al. | Dec. 22, 1931 |
| 1,860,745 | MacDougall | May 31, 1932 |
| 1,861,084 | Goranson et al. | May 31, 1932 |
| 1,973,996 | Reinstein | Sept. 18, 1934 |
| 1,982,709 | Thompson | Dec. 4, 1934 |
| 2,056,413 | Thompson et al. | Oct. 6, 1936 |
| 2,097,170 | Wilson | Oct. 26, 1937 |
| 2,139,704 | Thompson et al. | Dec. 13, 1938 |

Certificate of Correction

October 24, 1950

Patent No. 2,526,712

ALBERT R. THOMPSON

It is hereby certified that error appears in the printed specification of the above numbered patent requiring correction as follows:

Column 10, line 49, for "139" read *130*; column 23, line 43, for "turet" read *turret*; column 27, line 52, for "peelinig" read *peeling*; and that the said Letters Patent should be read as corrected above, so that the same may conform to the record of the case in the Patent Office.

Signed and sealed this 6th day of November, A. D. 1951.

[SEAL]

THOMAS F. MURPHY,
*Assistant Commissioner of Patents.*